United States Patent
Lim et al.

(10) Patent No.: US 9,563,057 B2
(45) Date of Patent: Feb. 7, 2017

(54) EYEWEAR TYPE TERMINAL AND CONTROL METHOD THEREOF

(71) Applicant: LG ELECTRONICS INC., Seoul (KR)

(72) Inventors: Gukchan Lim, Seoul (KR); Wonseok Joo, Seoul (KR); Jongseok Park, Seoul (KR); Chohee Kwon, Seoul (KR); Mijin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 14/526,092

(22) Filed: Oct. 28, 2014

(65) Prior Publication Data

US 2015/0338652 A1  Nov. 26, 2015

(30) Foreign Application Priority Data

May 26, 2014 (KR) ........................ 10-2014-0062893

(51) Int. Cl.
  *G02B 27/01* (2006.01)
  *G06F 3/01* (2006.01)
  (Continued)

(52) U.S. Cl.
  CPC ....... *G02B 27/0172* (2013.01); *G02B 27/0176* (2013.01); *G06F 1/163* (2013.01); *G06F 3/011* (2013.01); *G06F 3/0304* (2013.01); *G06K 9/00201* (2013.01); *H04N 5/225* (2013.01); *G02B 2027/014* (2013.01);
  (Continued)

(58) Field of Classification Search
  CPC ............ G06F 1/163; G06F 3/01; G06F 3/011; G06F 3/013; G06F 3/048–3/0483; G02B 27/017; G02B 27/0172; G02B 27/0176; G02B 2027/0174; G02B 2027/0178; G02C 11/00; G06K 9/00201–9/00214; G06K 9/00624–9/00704; H04N 5/225–5/2259; H04N 7/14–7/147; H04N 21/812–21/814
  See application file for complete search history.

(56) References Cited

U.S. PATENT DOCUMENTS

| | | | |
|---|---|---|---|
| 7,787,992 B2 | 8/2010 | Pretlove et al. | |
| 2012/0075168 A1* | 3/2012 | Osterhout | G06F 1/163 345/8 |
| 2014/0292653 A1 | 10/2014 | Kamba | |

FOREIGN PATENT DOCUMENTS

| | | |
|---|---|---|
| EP | 2207342 | 7/2010 |
| WO | 2013/035758 | 3/2013 |

OTHER PUBLICATIONS

European Patent Office Application Serial No. 14003872.0, Search Report dated Sep. 28, 2015, 8 pages.

\* cited by examiner

*Primary Examiner* — Nathan Danielsen
(74) *Attorney, Agent, or Firm* — Lee, Hong, Degerman, Kang & Waimey

(57) ABSTRACT

An eyewear type terminal includes a camera, an infrared light emitting part, a display unit and a controller. The camera obtains a first image using at least one image sensor. The infrared light emitting part is disposed to be spaced apart from the camera at a predetermined distance, and transmits infrared light using at least one infrared light emitting device. The display unit displays the first image and a marker moving along a first input signal on the first image, when the infrared light emitting part is driven. The controller obtains a second image of an object existing in the area where the marker is displayed using the at least one infrared light emitting part and the camera, when a second input (Continued)

signal is sensed, and outputs visual information related to the obtained second image to be adjacent to the object.

20 Claims, 33 Drawing Sheets

(51) Int. Cl.
*G06F 3/03* (2006.01)
*G06F 1/16* (2006.01)
*H04N 5/225* (2006.01)
*G06K 9/00* (2006.01)
*H04N 13/04* (2006.01)

(52) U.S. Cl.
CPC ............... *G02B 2027/0141* (2013.01); *G02B 2027/0178* (2013.01); *G06F 2203/04806* (2013.01); *H04N 13/044* (2013.01)

FIG. 5(a)
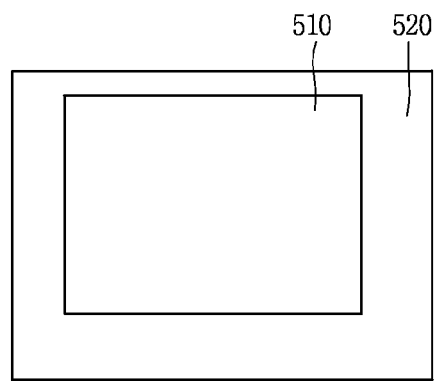
FIG. 5(b)
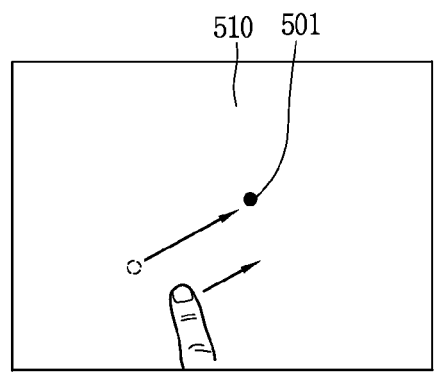
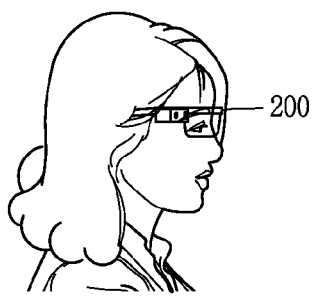

FIG. 5(c)
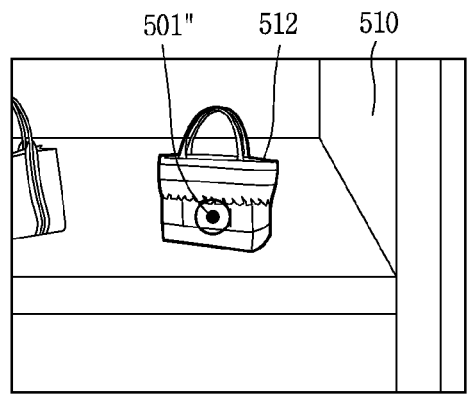
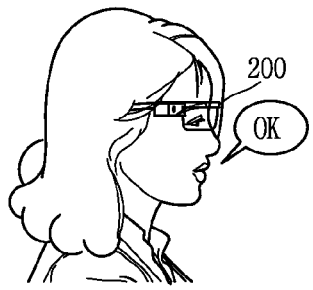
FIG. 5(d)
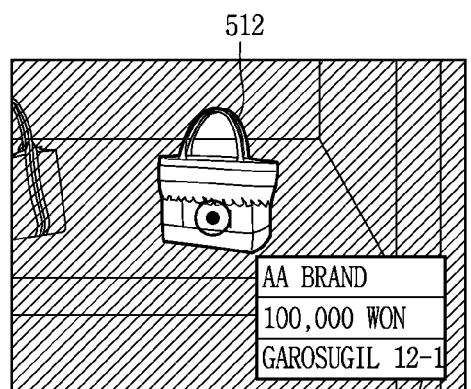
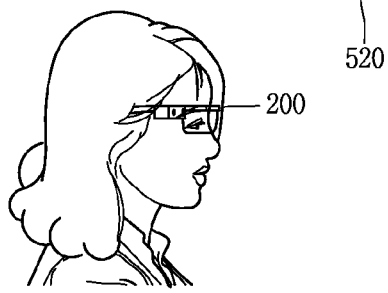

FIG. 7(c)
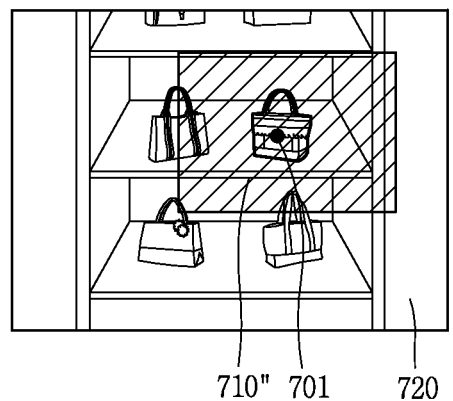
710" 701   720
FIG. 7(d)
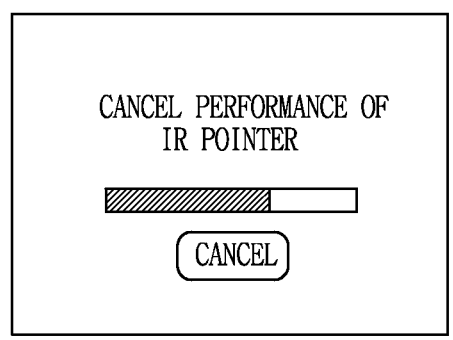

FIG. 8A(c)
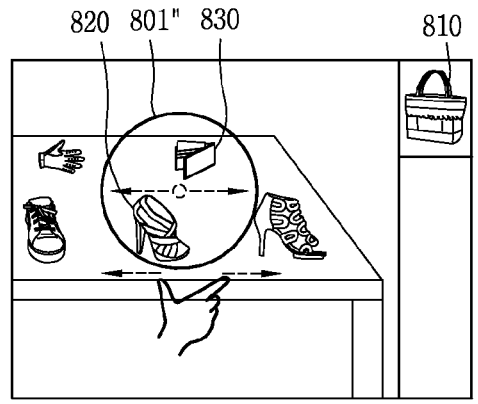
FIG. 8A(d)
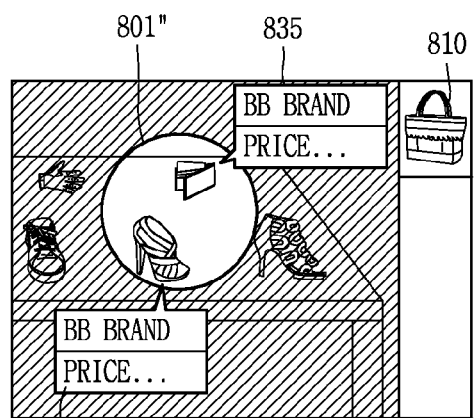
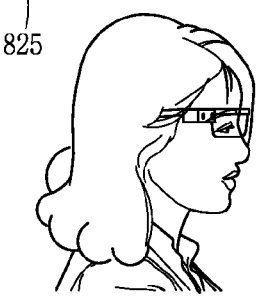

EYEWEAR TYPE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Application No. 10-2014-0062893, filed on May 26, 2014, the contents of which are hereby incorporated by reference herein in its entirety.

BACKGROUND OF THE INVENTION

1. Field of the Invention

The present disclosure relates to a terminal configured to be wearable on a user's head like glasses.

2. Description of the Conventional Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

A mobile terminal is not used in a state in which a user frequently holds the mobile terminal with one hand but also has recently extended to a wearable device capable of being worn on a user's body. An example of the wearable device is a glass type terminal.

A conventional glass type terminal may be provided with a camera. In this case, the actual viewing angle of a user wearing the terminal is wider than the viewing angle of the camera of the terminal, and hence, there is a difference between the recognition range of objects through the user's actual viewing angle and the recognition range of the objects through the viewing angle of the camera of the terminal. That is, the same object is viewed through a user's eye, but is not recognized through the glass type terminal.

When the user is interested in only a specific object in the user's viewing angle, the conventional glass type terminal performs image processing on all objects existing in the viewing angle thereof. Therefore, the time taken to perform the image processing is long, and resources are wasted.

SUMMARY OF THE INVENTION

Therefore, an aspect of the detailed description is to provide a glass type terminal and a control method thereof, which can minimize a difference between the recognition range of objects through a user's actual viewing angle and the recognition range of the objects through the terminal, and selectively perform image processing on only an object in which the user is interested.

Another aspect of the detailed description is to provide a glass type terminal and a control method thereof, which can recognize an object in which a user is interested, to provide visual information desired by a user or to enable a related function to be automatically performed.

Still another aspect of the detailed description is to provide a glass type terminal and a control method thereof, which can continuously track the position of an object in which a user is interested even when the object is out of the viewing angle of the terminal.

To achieve these and other advantages and in accordance with the purpose of this specification, as embodied and broadly described herein, a glass type terminal includes: a main body configured to be wearable on a user's head; a camera coupled to the main body, the camera obtaining a first image using at least one image sensor; an infrared light emitting part disposed to be spaced apart from the camera at a predetermined distance, the infrared light emitting part transmitting infrared light using at least one infrared light emitting device; a display unit configured to output the first image, and display a marker moving along a first input signal on the first image when the infrared light emitting part is driven; and a controller configured to obtain a second image of an object existing in the area where the marker is displayed using the at least one infrared light emitting part and the camera, when a second input signal is sensed, and output visual information related to the obtained second image to be adjacent to the object.

In one exemplary embodiment, when a first input is sensed, the controller may create the marker and display the created marker in one area of the display unit. When a second input is sensed, the controller may select the object existing in the area where the marker is displayed, and output a display corresponding to the selection.

In one exemplary embodiment, when a third input is sensed, the controller may display the second image of the selected object and the visual information related to the second image in an area distinguished from the first image, and display a new marker on the first image.

In one exemplary embodiment, the controller may output, on the first image, an image corresponding to whether a zoom-in or zoom-out function of the camera is performed, based on a spacing distance between the selected object and the display unit.

In one exemplary embodiment, the controller may change at least one of the position and size of the displayed marker, based on a predetermined user gesture.

In one exemplary embodiment, the controller may change the selection of the object, based on at least one of the position and size of the changed marker.

In one exemplary embodiment, when the object selected by the marker is out of a predetermined range based on the display unit, the controller may output an indicator representing the degree and position where the object is out of the predetermined range in one area of the display unit.

In one exemplary embodiment, the visual information related to the second image may be changed depending on the type of the selected object. The visual information may include at least one of installation information corresponding to the second image, guidance information of a process related to the second image, and position information of an object corresponding to the second image, as a result obtained by searching a webpage matched to the second image.

In one exemplary embodiment, when the object existing in the area where the marker is displayed is not recognizable, the controller may control the display unit to output a message representing that the marker disappears and the second image is not obtainable.

In one exemplary embodiment, the controller may control the display unit to allow the visual information to disappear, in response to that a predetermined touch gesture is sensed after the visual information is output, and output another visual information related to the second image, based on the sensed touch gesture.

In one exemplary embodiment, the controller may differently display the shape of the marker depending on the type of the visual information related to the second image.

In one exemplary embodiment, when a first control signal is received, the controller may perform a marker function of displaying the marker on the first image. When a second control signal is received, the controller may end the performance of the marker function so that the marker disappears on the first image.

In one exemplary embodiment, the infrared light emitting part including the at least one infrared light emitting device may be formed to be attachable/detachable to/from a frame part of the main body.

In one exemplary embodiment, the controller may control the operation of the at least one infrared light emitting device so that the color, size, shape and external recognition of a infrared signal transmitted from the infrared light emitting part are changed, based on predetermined setting information.

In one exemplary embodiment, the controller may control the second image and the visual information related to the second image to be stored in a selected area, in response to that a predetermined input signal is sensed.

In one exemplary embodiment, when an object corresponding to the second image stored in the selected area is detected from the first image, the controller may control an alarm corresponding to the detection and the visual information related to the stored second image to be again output on the display unit.

In one exemplary embodiment, when update information on an object corresponding to the second image stored in the selected area is received, the controller may change the visual information related to the stored second image, based on the received update information.

In one exemplary embodiment, the controller may control the display unit to output detailed information on the visual information, in response to that a predetermined touch gesture is sensed in the area where the visual information is output.

In one exemplary embodiment, when a predetermined input signal is sensed in a state in which a first marker is displayed on the second image, the controller may control a second marker to be newly displayed on the first image while maintaining the display of the first marker.

In one exemplary embodiment, the controller may control the first marker to continuously track the position of an object corresponding to the second image. The controller may control the second marker to select another object existing on the first image, based on a predetermined input signal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings:

FIGS. 5(a) to 5(d) are conceptual diagrams illustrating a method for outputting visual information related to an object selected using a marker according to an exemplary embodiment;

FIGS. 7(a) to 7(d) are conceptual diagrams illustrating examples of a method for performing a marker function and a method for canceling the performance of the marker function according to an exemplary embodiment;

DETAILED DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
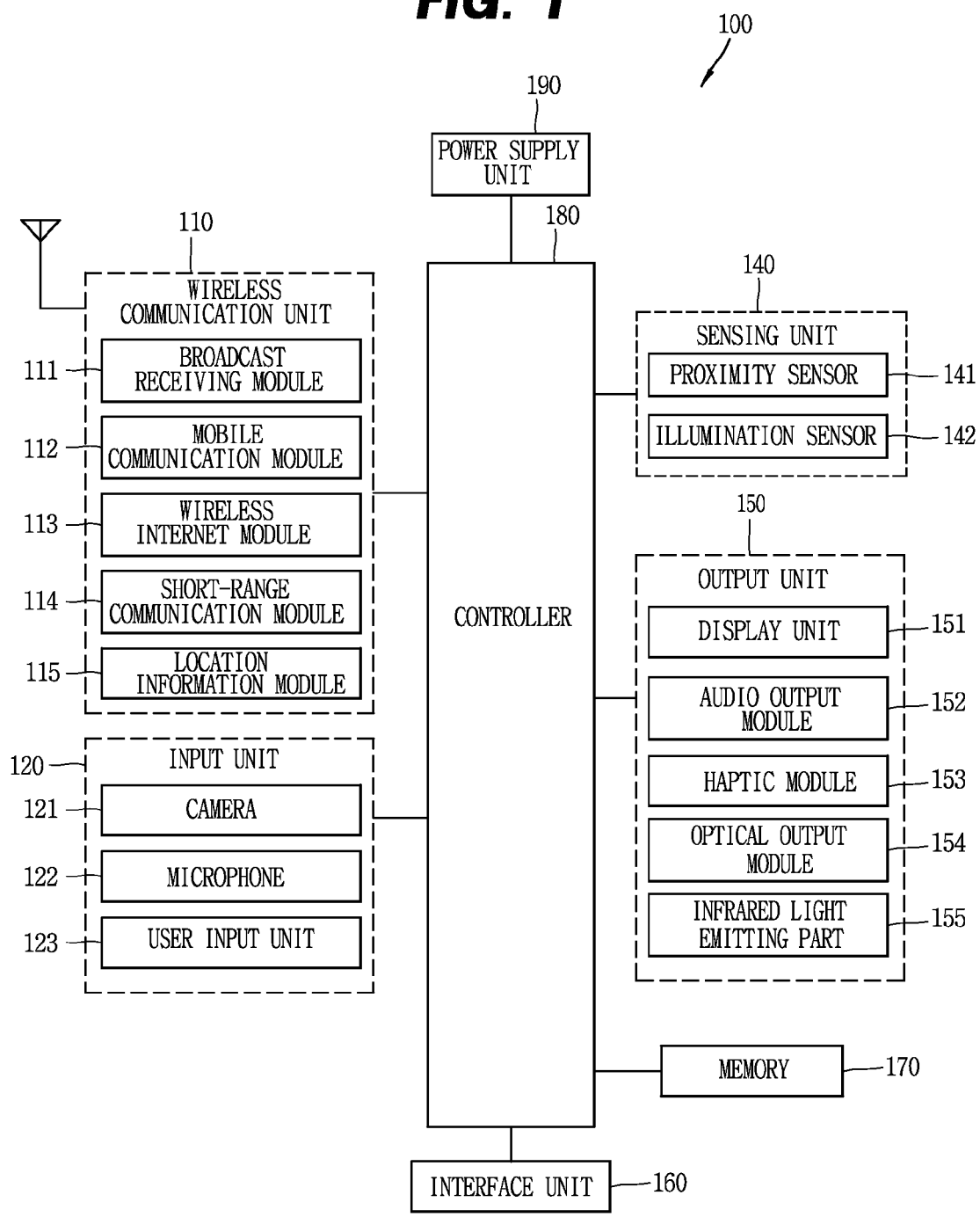
FIG. 1 is a block diagram of a glass type terminal according to an exemplary embodiment.

FIG. 1 is a block diagram of a glass type terminal 100 according to an embodiment of the present invention.

The glass type terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the glass type terminal 100 is shown having wireless communication unit 110 configured with several commonly implemented components. For instance, the wireless communication unit 110 typically includes one or more components which permit wireless communication between the glass type terminal 100 and a wireless communication system or network within which the glass type mobile terminal 100 is located.

The wireless communication unit 110 typically includes one or more modules which permit communications such as wireless communications between the glass type terminal 100 and a wireless communication system, communications between the glass type terminal 100 and another mobile terminal, communications between the glass type terminal 100 and an external server. Further, the wireless communication unit 110 typically includes one or more modules which connect the glass type terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The glass type terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, an optical output module 154, and an infrared light emitting part 155. The display unit 151 may have an inter-layered structure or an integrated structure with a touch sensor in order to facilitate a touch screen. The touch screen may provide an output interface between the glass type terminal 100 and a user, as well as function as the user input unit 123 which provides an input interface between the glass type terminal 100 and the user.

The infrared light emitting part 155 is configured to generate infrared light and to project to outside. In order to support the viewing angle range of the camera 121, the infrared light emitting part 155 may be disposed in the form where a plurality of infrared light emitting devices are condensed, at a position adjacent to the camera 121. The infrared light emitting part 155 may operate independently from the camera 121, or may operate so as to generate light when the camera 121 is driven. An arrangement structure and a form of the infrared light emitting part 155 of the glass type terminal 100 according to the present invention will be explained in more detail with reference to the attached drawings.

The interface unit 160 serves as an interface with various types of external devices that can be coupled to the glass type terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the glass type terminal 100 may perform assorted control functions associated with a connected external device, in response to the external device being connected to the interface unit 160.

The memory 170 is typically implemented to store data to support various functions or features of the glass type terminal 100. For instance, the memory 170 may be configured to store application programs executed in the glass type terminal 100, data or instructions for operations of the glass type terminal 100, and the like. Some of these application programs may be downloaded from an external server via wireless communication. Other application programs may be installed within the glass type terminal 100 at time of manufacturing or shipping, which is typically the case for basic functions of the glass type terminal 100 (for example, receiving a call, placing a call, receiving a message, sending a message, and the like). It is common for application programs to be stored in the memory 170, installed in the glass type terminal 100, and executed by the controller 180 to perform an operation (or function) for the glass type terminal 100.

The controller 180 typically functions to control overall operation of the glass type terminal 100, in addition to the operations associated with the application programs. The controller 180 may provide or process information or functions appropriate for a user by processing signals, data, information and the like, which are input or output by the various components, or activating application programs stored in the memory 170. As one example, the controller 180 controls some or all of the components according to the execution of an application program that have been stored in the memory 170.

The power supply unit 190 can be configured to receive external power or provide internal power in order to supply appropriate power required for operating elements and components included in the glass type terminal 100. The power supply unit 190 includes a battery, and the battery is configured to be chargeable.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Figure 2:
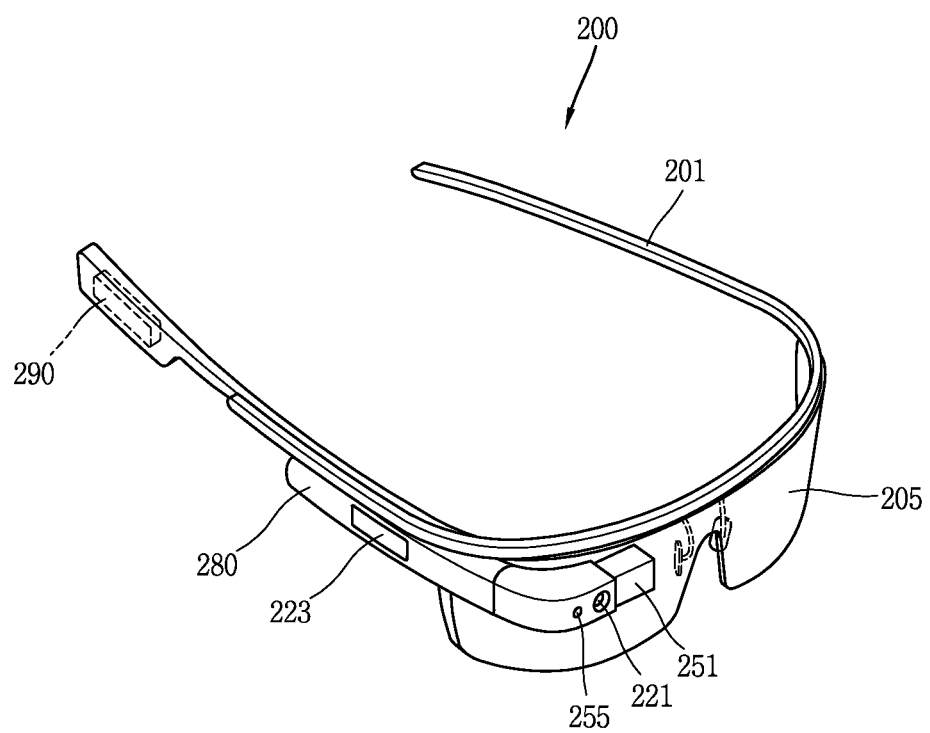
FIG. 2 is a perspective view illustrating a glass type terminal according to an exemplary embodiment.

FIG. 2 is a view illustrating a glass type terminal 200 according to an embodiment of the present invention when viewed from different directions.

Referring to FIG. 2, the glass type terminal 200 is configured to be wearable on a user's head like glasses, which may be provided with a frame unit 201 (or case, housing, etc.). The frame unit 201 may be formed of a flexible material for enhanced wearability.

The frame unit 201 is supported by a head, and provides a space where various types of components are mounted. As shown, electronic components such as a controller 280, a power supply unit 290 and an audio output module may be mounted in the frame unit 201. A lens 205 for covering at least one of a left eye and a right eye may be detachably mounted to the frame unit 201.

The controller 280 is configured to control various types of components of the glass type terminal 200. The controller 280 may be understood to have a configuration corresponding to the aforementioned controller 180. In the drawings, the controller 280 is installed at a frame on one side of a head. However, the position of the controller 280 is not limited to this.

A display unit 251 may be implemented in the form of a Head Mounted Display (HMD). The HMD indicates a display mounted to a head and configured to display an image in front of a user's eyes. The display unit 251 may be disposed to correspond to at least one of a left eye and a right eye, such that an image is directly provided in front of a user's eyes when the user has worn the glass type terminal 200. In the drawings, the display unit 251 is arranged in correspondence to a right eye so that an image can be output toward a user's right eye.

The display unit 251 may project an image to a user's eyes using a prism. The prism may be formed to be transmissive so that a user can see not only a projected image, but also a general view (a range viewable through a user's eyes).

An image output to the display unit 251 may be overlapped with a general view. The glass type terminal 200 may provide an Augmented Reality (AR) configured to overlap a virtual image to a real image or background for a single image.

The camera 221 is disposed close to at least one of a left eye and a right eye, and is configured to capture a front image. The camera 221 can obtain a scene at which a user is looking as an image, because it is positioned close to the user's eye.

In the drawings, the camera 221 is provided at the controller 280. However, the present invention is not limited to this. For instance, the camera 221 may be installed at the frame unit 201. Alternatively, the camera 221 may be provided in plurality so as to obtain a stereoscopic image.

The glass type terminal 200 may be provided with a user input unit 223 manipulated for input of a control command. The user input unit 223 may employ any tactile method that allows a user to perform manipulation such as touch, push, scroll or the like. In the drawings, a touch type of user input unit 223 is provided at the frame unit 201.

The glass type terminal 200 may be further provided with a microphone—for receiving a sound to process the sound as electrical voice data and vibration data, and a sound output module for outputting a sound. Here, the sound output module may be implemented to transmit a sound using a sound output method or a bone conduction method. When the sound output module is implemented using the bone conduction method, the sound output module may be provided in the same insertion part as the microphone.

The glass type terminal 200 may be further provided with an infrared light emitting part 255 for generating infrared light using at least one infrared light emitting device (e.g., an IR LED). The infrared light emitting part 255 is disposed adjacent to the camera 221, and emits the generated infrared light to the exterior. In order to support the viewing angle range of the camera 221, the infrared light emitting part 255 may be disposed in the form where a plurality of infrared light emitting devices are condensed at a position adjacent to the camera 221. The infrared light emitted to the exterior through the infrared light emitting part 255 may be scanned at an arbitrary position of an image output through the display unit 251. The infrared light emitting part 255 may change the position and direction of the infrared light emitted to the exterior, based on a predetermined input signal.

Hereinafter, a hardware configuration of the infrared light emitting part 255 for performing an operation according to an exemplary embodiment will be described in detail with reference to FIGS. 3A to 3E and 4A to 4C.

First, FIGS. 3A to 3E are diagrams illustrating one example in which the infrared light emitting part 255 is built in the glass type terminal 200 to be integrally formed with the glass type terminal 200.

Figure 3A:
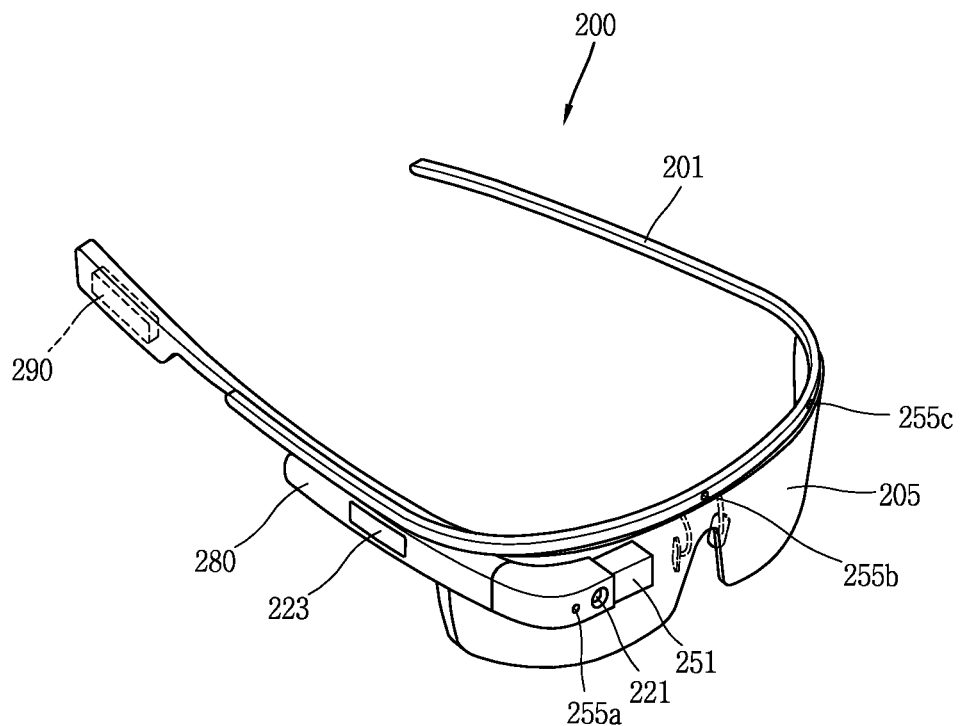
FIGS. 3A to 3E are diagrams illustrating one structure of an infrared light emitting device provided in the glass type terminal according to an exemplary embodiment.

As shown in FIG. 3A, the infrared light emitting part 255 may be disposed at a position 255a adjacent to the camera 221 provided at a right side of the frame part 201. The infrared light emitting part 255 may be further provided at a center 255b and a right side 255c of the frame part 201 in order to support the viewing angle range of the camera 221. When the infrared light emitting part 255 is provided in plural numbers as described above, the plurality of infrared light emitting parts 255 may selectively emit light according to a predetermined control signal.

Figure 3B:
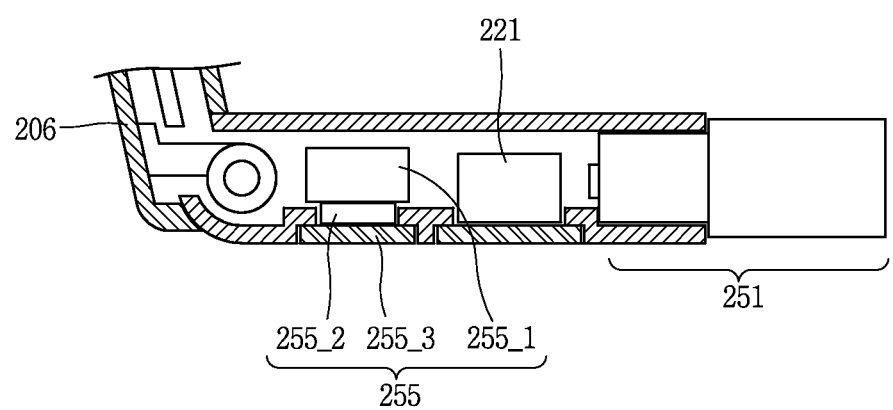

The infrared light emitting part 255, as shown in FIG. 3B, allows infrared light to be generated through an infrared light emitting device 255_1 and sends the generated infrared light to a lens 255_2. Then, the lens 255_2 converts the infrared light into parallel light, and the converted parallel light is emitted to the exterior through a window 255_3. The infrared light emitted to the exterior is scanned on a virtual image output on the display unit 251. As shown in FIG. 3B, the infrared light emitting part 255, the camera 221 and the display unit (an optical module and a prism) 251 may be sequentially disposed at the frame part 201 adjacent to the left side of a user's head and the frame part 201 adjacent to the front of the user's head. However, the present disclosure is not limited to the disposition order, and the camera 221, the infrared light emitting part 255 and the display unit 251 may be sequentially disposed.

Meanwhile, as described above, the infrared light emitted from the infrared light emitting part 255 is displayed in a predetermined shape on the virtual image output on the display unit 251. Hereinafter, such a display will be called as a "marker". The marker may have the shape of an arrow or another object, e.g., a spot, cursor, prompt, outline or the like, but is not limited thereto.

Figure 3C:
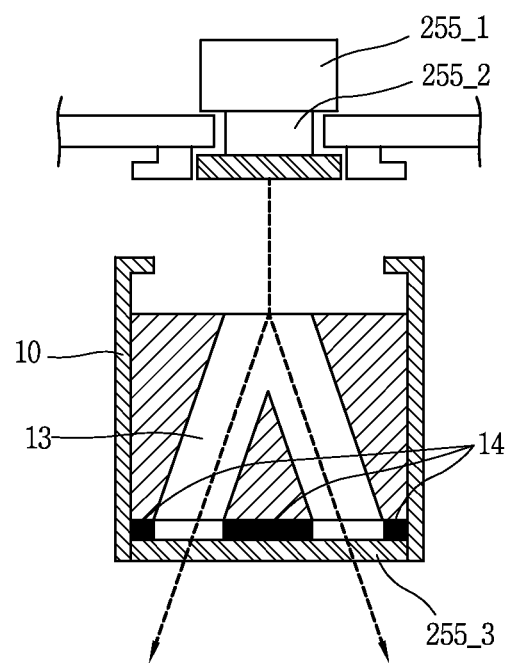
Figure 3D:
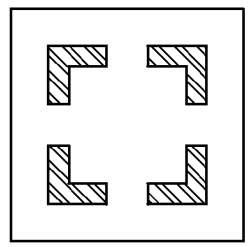
Figure 3D:
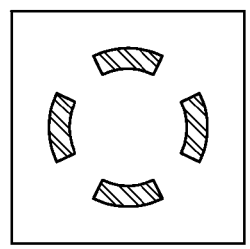
Figure 3D:
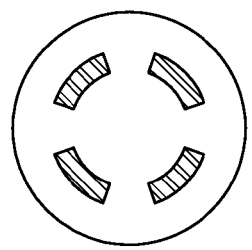
Figure 3D:
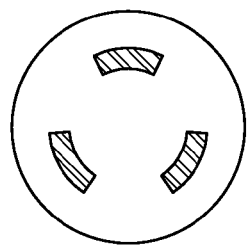

The shape of the marker may be changed by artificially adjusting the angle and amount of the infrared light emitted from the infrared light emitting part 255, depending on the structure and shape of the window 255_3. Specifically, as shown in FIG. 3C, a replaceable window is mounted on the front of the lens 255_2, thereby adjusting the angle, direction and amount of the infrared light emitted from the infrared light emitting part 255. Here, the replaceable window forms paths 13 with various angles in order to have holes disposed at different spacing distances, differently forms the shape of a case 10, or differently forms the size of the hole that the infrared light passes through a taping part 14. Accordingly, as shown in FIG. 3D(a) to 3D(d), the infrared light emitted according to the structure and shape of the window 255_3 may have a quadrangular shape, 3D(a), a circular shape, 3D(b), 3D(c) or 3D(d), or another shape. The portion at which the case 10 of the replaceable window and the lens 255_2 are bonded to each other is formed in a corresponding stepped structure (e.g., a separation prevention projection and a separation prevention hole), so that the case 10 of the replaceable window is not separated from the lens 255_2 but can be fixed to the lens 255_2.

Figure 3E:
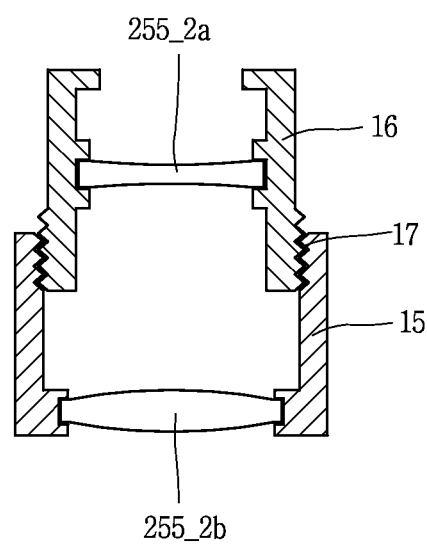

The lens 255_2 disposed between the infrared light emitting device 255_1 and the window 255_3 may be formed into a double lens structure. In this case, the size and shape of the infrared light emitted from the infrared light emitting part 255 may be changed. Specifically, as shown in FIG. 3E, a first lens 255_2a is bonded to both ends of a first frame part 16, and the first frame part 16 may be connected to a second frame part 15 to which a second lens 255_2b is bonded through a fastening mechanism such as a coupling. One end at which the first frame part 16 is bonded to the infrared light emitting device 255_1 may be formed into a stepped structure. The first and second lenses 255_2a and 255_2b may be adjacent to or spaced apart from each other as at least one of the first and second frame parts 16 and 15 rotates. Accordingly, the size and shape of the infrared light emitted from the infrared light emitting part 255 can be changed.

Figure 4A:
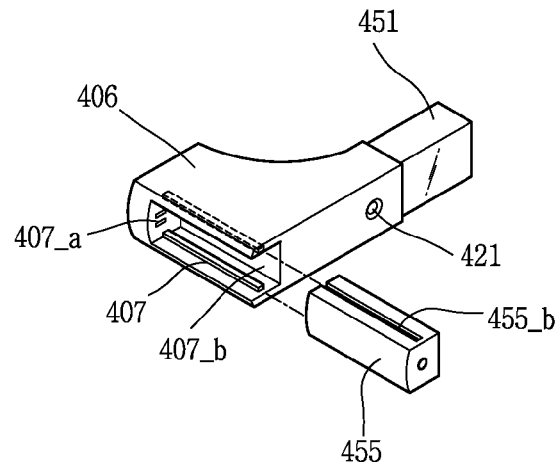
FIGS. 4A to 4C are diagrams illustrating another structure of the infrared light emitting device provided in the glass type terminal according to an exemplary embodiment.
Figure 4B:
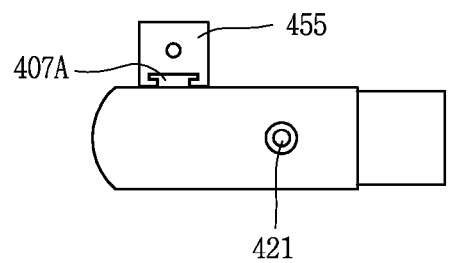
Figure 4C:
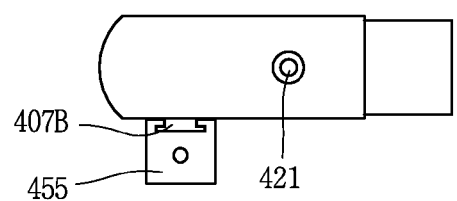

FIGS. 4A to 4C are diagrams illustrating an example in which an infrared light emitting part is formed to be attachable/detachable to/from a glass type terminal.

Referring to FIG. 4A, in the glass type terminal, a side frame part 406 having a camera 421 built therein may be provided with an accommodating part 407 in which the attachable/detachable infrared light emitting part 455 can be mounted. The accommodating part 407 is formed into a structure in which the attachable/detachable infrared light emitting part 455 can be slidingly inserted in the length direction thereof, and a separation prevention projection or a stepped structure 407_b is formed on an inner surface of the accommodating part 407, bonded to one end of the infrared light emitting part 455. Thus, the infrared light emitting part 455 mounted in the accommodating part 407 can be prevented from being separated from the accommodating part 407.

If the infrared light emitting part 455 is slid in a first direction (insertion direction) into the accommodating part 407, a separation prevention projection 455b is inserted into the separation prevention hole 407_b, so that the infrared light emitting part 455 may be mounted in a main body of the glass type terminal. On the other hand, if the infrared light emitting part 455 is slid in a second direction (extraction direction) opposite to the first direction from the accommodating part 407, the separation prevention projection 455_b is separated from the separation prevention hole 407_b, so that the infrared light emitting part 455 is separated from the main body of the glass type terminal.

Meanwhile, a magnetic 407_a may be provided on the inner surface of the accommodating part 407 and one side surface of the infrared light emitting part 455, which are contacted with each other through bonding. In this case, the insertion through the sliding can be more easily performed, and the infrared light emitting part 455 can be further prevented from being separated from the accommodating part 407.

Meanwhile, FIGS. 4B and 4C illustrate one example of a structure in which the accommodating part is formed in the side frame part of the glass type terminal, but the attachable/detachable light emitting part 455 is mounted at an upper end position 407A of the frame part, adjacent to the camera 412 or a lower end position 407B of the frame part, adjacent to the camera 421. As shown in FIGS. 4B and 4C, a separation prevention cap of a stepped structure may be formed in the frame part contacted with the infrared light emitting part 455. However, the is mounting structure of the attachable/detachable infrared light emitting part 455 is not limited to the structures shown in these figures.

Hereinafter, FIGS. 5(a) to 5(d) show conceptual diagrams illustrating an exemplary operation of the glass type terminal 200 having the structure described above according to an exemplary embodiment.

Referring to the diagrams shown in FIG. 5(a), if a predetermined input, e.g., an input of a gesture of raising and then lowering the frame part 201 of the glass type terminal 200 with a user's hand is sensed in the glass type terminal 200 as shown in FIG. 5(a), the glass type terminal 200 may recognize the sensed input as a control signal for driving the infrared light emitting part 255.

Accordingly, the glass type terminal 200 creates a marker 501 corresponding to an infrared signal transmitted from the infrared light emitting part 255, and outputs the created marker on a screen output on the display unit 251. In this state, the marker may be translucently or opaquely output so that the user can easily visually identify the marker. The marker may be initially output in a predetermined area on the display unit 251, e.g., at the center of the display unit 251.

Meanwhile, the screen output on the display unit 251 may be a preview screen 510 of the camera 221, which is displayed in real time while being overlapped with a general visual field 520. In this state, when the preview screen 510 is viewed to only the user of the glass type terminal 200, the marker 501 may also be implemented to be viewed to only the user.

The marker 501 may be formed in various shapes of an arrow, a cursor, a prompt, an outline and the like, as well as the shape of a spot corresponding to infrared light.

If the marker 501 is displayed on the preview screen 510, the marker 501 may move on the display unit 251 according to a predetermined input signal. For example, if the user performs a touch on the marker 501 using a user's finger as shown in FIG. 5(b), the camera 221 provided in the glass type terminal 200 recognizes the user's finger positioned at the marker 501. The glass type terminal 200 controls an operation of the infrared light emitting part 255 so that the marker 501 is displayed according to the movement of the recognized finger.

In this state, the glass type terminal 200 may set the area in which the marker 501 is movable to be greater than the entire area of the preview screen 510 or to be limited to a partial area of the preview screen 510. When the marker 501 is set to be out of the viewing angle range of the camera 221, an indicator indicating a current position of the marker 501 may be displayed rather than the marker 501 in one area of the display unit 251.

Meanwhile, if the marker 501 is fixed to a specific object in the preview screen 510, e.g., a bag image 512, and a predetermined input signal is sensed in the glass type terminal 200, the glass type terminal 200 performs image processing on only the object 512 indicated by the marker 501. That is, the specific object 512 is selected as a user's interested object using the marker 501.

For example, if a predetermined voice signal, e.g., "OK!" is input in a state in which the marker 501 is fixed to the bag image 512 viewed on the preview screen 510 as shown in FIG. 5(c), the glass type terminal 200 selects the object indicated by the marker 501, i.e., the bag image 512, as a user's interested object. However, in addition to the voice signal, the predetermined input signal for selecting the object may be generated by a predetermined user gesture, a touch gesture on one area of the frame part of the main body or a virtual image, the movement of a user's pupil, or the like.

As such, the object selected using the marker 501 necessarily exists within the recognition range of the camera 221. The marker 501 performs a function of guiding an object to be selected to exist in the display unit 251. That is, when the object to be selected using the marker 501 is out of the recognition range of the camera 221 but exists in the user's viewing angle, the user may intuitively recognize whether the object to be selected is out of the display unit 251 and its degree, based on a current position of the marker 501, a spacing degree of the object to be selected, and a spaced direction.

As such, the user moves the marker 501 by moving the user's head to the left/right/top/bottom or generating a predetermined input signal, based on the current position of the marker 501, to enable the marker 510 to be displayed on the object to be selected. Accordingly, the glass type terminal 200 according to the exemplary embodiment can minimize the difference between the recognition range of the object through the user's visual field and the recognition range of the object through the terminal.

If a specific object is selected by the marker 501 as described above, a display corresponding to the selection may be output on the display unit 251. For example, the glass type terminal 200 may output a highlighting effect (e.g., displaying a bold line or another color) to the selected bag image 512, apply a shadow effect to the background image except the selected bag image 512, or convert the selected bag image 512 into a 3D image and output the converted 3D image. If a specific object is selected as described above, the form (e.g., the color or shape) of the marker 501 may be changed (501").

If a specific object is selected using the marker 501 as described above, the glass type terminal 200 may recognize the selected object through the camera 221, and output an image of the recognized object in one area of the display unit 251. The image of the recognized object may be displayed while being overlapped with the object on the display unit 251, or be separately displayed in a predetermined area, e.g., at an upper right side of the display unit 251. Accordingly, the glass type terminal 200 according to the exemplary embodiment performs image processing on only the selected object, so that it is possible to reduce the time taken to perform the image processing and to minimize waste of unnecessary resources.

The glass type terminal 200 analyzes the recognized object, and outputs at least one visual information related to the recognized object on the display unit 251, based on the analysis result.

Here, the category or kind of the visual information related to the recognized object may be changed depending on the analysis result. That is, the glass type terminal 200 clearly specifies an interested object using the marker 501, and displays visual information to be interested by the user to be adjacent to the object indicated by the marker 501 by performing a function related to the corresponding object.

Here, the visual information to be interested by the user may be, for example, visual information including names, web pages, link information, relative texts, images, moving pictures and the like, which can be obtained through web search of the corresponding object, or visual information including names related to the corresponding object, contact address information, calendar information and the like, which are previously stored in the glass type terminal 200.

For example, when the object selected through the marker 501 is the bag image 512 as shown in FIG. 5(c), visual information including a brand, a price, purchase information and the like, which are matched to the corresponding bag image 512, as the visual information to be interested by the user, corresponding to the selected bag image 512, may be output as a pop-up image as shown in FIG. 5(d).

In this state, the pop-up image 520 is implemented to move together as the object selected by the marker 501 moves. If the selection of the object selected by the marker 510 is cancelled, the pop-up image 520 may be implemented to disappear from the display unit 251, corresponding to the cancellation.

When the position of the object selected by the marker 501 is passively changed on the display unit 251 as the selected object does not move, but the user of the glass type terminal 200 moves, the marker 510 may be continuously displayed on the selected object by tracking the current position of the selected object. The corresponding pop-up image 520 may be displayed adjacent to the selected object by moving together as the marker 510 moves. Therefore, the visual information to be interested by the user may be displayed along the selected object as if a tag was attached to the selected object.

As shown in FIG. 5(d), position information of the glass type terminal 200 may be further included in the pop-up image 520. That is, position information on the object selected using the marker 510 may be included in the visual information to be interested by the user. Information on the time when the object is selected using the marker 501 may be further included in the pop-up image 520. The pop-up image 520 may be created and displayed in plural numbers according to the kind of the selected object.

As such, in the exemplary embodiment, a marker is displayed on an image by driving the infrared light emitting device together with the camera, so that it is possible to minimize the difference between the recognition range of the object through the user's visual field and the recognition range of the object through the terminal. Further, only an object to be interested by the user is recognized, thereby minimizing waste of resources. Further, visual information related to the recognized object is provided along the marker indicating the marker, thereby providing convenience to the user.

Meanwhile, as described above, if a predetermined input signal is sensed, the controller 280 of the glass type terminal 200 may select a specific object by operating the infrared light emitting part 255 transmitting an infrared signal together with the camera 221, and output visual information related to the selected object along the selected object.

As an example, a control method for selecting a specific object, using a marker corresponding to an infrared signal transmitted from the infrared light emitting part 255, and displaying visual information related to the selected object will be described in detail.

Figure 6:
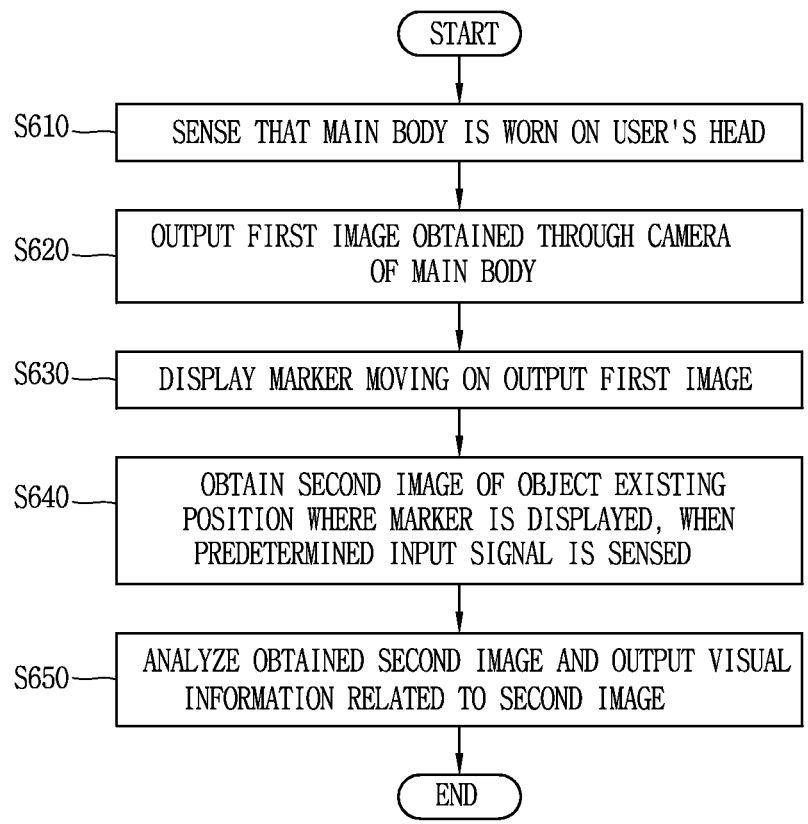
FIG. 6 is a flowchart illustrating a control method of the glass type terminal according to an exemplary embodiment.

Hereinafter, FIG. 6 is a flowchart illustrating a control method of the glass type terminal according to an exemplary embodiment.

First, the controller 280 of the glass type terminal 200 senses that the main body is wearable on a user's head (S610).

That the glass type terminal 200 senses that the main body is worn on the user's head may be made through various manners. Specifically, the glass type terminal 200 may sense an inclination and movement of the main body, sense a touch (or proximity touch) applied to a specific point or area of the main body, analyze an image photographed through the camera 221 provided in the main body, sense a predetermined input signal, e.g., a user's biological signal (e.g., a pulse signal, etc.), or sense whether the main body is worn on the user's head, based on a change in temperature of the frame part, or the like.

Next, the camera 221 provided in the main body is activated, and a first image photographed by the camera 221 is output on the display unit 251 (S620).

The first image output on the display unit 251 may be a preview screen or virtual image output by being overlapped with a front visual field viewed by the user. That is, the first image is a partial image in the scene viewed in real time by the user. The first image may be changed in real time depending on user's movement.

Next, the infrared light emitting part 255 disposed to be spaced apart from the camera 221 of the main body at a predetermined distance is activated, and a display corresponding to an infrared signal emitted from the infrared light emitting part 255, i.e., a marker is displayed on the output first image (S630).

Here, the shape of the marker is not limited. For example, the marker may have the shape of a spot, prompt, cursor, arrow or the like. As described with reference to FIGS. 3C to 3E, the shape of the marker may be changed into another shape, depending on the shape of the case 10 of the window 255_3, the spacing degree of the taping part 14, or the double lens structure of the window 255_3.

Here, the infrared light emitting part 255 is configured to transmit infrared light using one or more infrared light emitting devices. The infrared light emitting part 255 is disposed adjacent to the camera 221 in order to support the viewing angle of the camera 221. The infrared light emitting part 255, as described with reference to FIGS. 4A to 4C, may be formed to be attachable/detachable to/from the main body. The infrared light emitting part 255 may be driven in dependence on the operation of the camera 221, or be implemented to operate when a separate input signal is sensed.

The marker corresponding to the transmitted infrared light may be initially displayed in a predetermined area, e.g., at a center in the display unit 251. If a predetermined first input signal is sensed, the controller 280 may control the marker to move in the display unit 251 according to the first input signal.

Here, the first input signal is a user input for changing the position of the marker. The first input signal may be at least one of a predetermined voice signal (e.g., 'movement'), a touch gesture on the main body, the movement of a user's pupil, and a predetermined user gesture. The first input signal may include start and end signals for changing the position of the marker. For example, when the first input signal is a touch gesture on the marker, a touch-down event on the marker may become the start signal, and a touch-up event performed after the marker is dragged to a desired position may become the end signal.

Next, the controller 280 controls the operation of the camera 221 to obtain a second image of an object existing at the position where the marker is displayed, in response to that a second input signal is sensed (S640).

Here, the second input signal is a user input for selecting and extracting an object indicated by the marker. For example, the second input signal may be at least one of a predetermined voice signal (e.g., 'selection'), a touch gesture on the main body, the movement of a user's pupil (e.g., when the user's pupil is fixed to the marker for a certain period of time), and a predetermined user gesture.

The object indicated by the marker includes all objects including independent persons, objects and the like, that exist in the area where the marker is displayed. For example, when the marker is displayed on the face of a specific person, the object becomes the "specific person". In addition, the object indicated by the marker means an independent object in the minimum range, specified by the marker. For example, when the marker is displayed on a specific portion of a vehicle, e.g., a vehicle wheel, the object does not become the vehicle but becomes the "vehicle wheel".

The obtained second image may be displayed while being overlapped on the object having the marker displayed thereon, or be separately displayed in one area of the display unit.

Meanwhile, the obtained second image may be output in a state in which the resolution or illumination intensity of the second image is changed depending on a spacing distance between the corresponding object and the display unit 251.

To this end, the controller 280 may determine whether the zoom-in or zoom-out function of the camera is performed based on the spacing distance between the selected object and the display unit 251, and output an image corresponding to the performance of the zoom-in or zoom-out function on the first image. Accordingly, the user may receive an image of the object, of which resolution is further improved (the zoom-in function), or further receive an image around the object (the zoom-out function).

The controller 280 may perform displaying of the marker, selection of an object using the marker, a preview function of the selected object, and the like, based on a user input.

Specifically, the controller 280 may create a marker corresponding to infrared light and display the created marker in one area of the display unit 251, in response to that a first input is sensed. If a second input is sensed, the controller 280 may select an object existing in the area where the marker is displayed, and output a display corresponding to the selection on the display unit 251.

Here, the first and second inputs may be implemented using the same input method or similar input methods. For example, the controller 280 may analyze an input voice signal, and process the analyzed voice signal as an input signal value corresponding to any one of the first input ('marker') or the second input ('selection').

The display corresponding to the selection is a display capable of visually distinguishing the object existing in the area where the marker is displayed from a peripheral image. For example, the size or color of the second image may be changed so that the selected object is emphasized. In addition, the display corresponding to the selection may be output as a voice signal (e.g., 'click').

Next, the controller 280 generates visual information related to the obtained second image by analyzing the second image, and provides the generated visual information along the selected object (S650).

The controller 280 may differently determine the category, kind and amount of the visual information related to the obtained second image, based on the analysis result of the second image.

As an example, if the second image is an image of the face of a specific person, based on the analysis result, the controller 280 may generate visual information by detecting, from the glass type terminal 200, the name, official title, character, recent schedule information, and the like, which are matched to the image of the face. As another example, if the second image is an image of shoes, based on the analysis result, the controller 280 may generate visual information, using a result obtained by searching, on a webpage, the brand, price, purchase information, purchase place, and the like, which are matched the image of the shoes.

The visual information may be output as a pop-up image, e.g., a speech bubble, at a position adjacent to the object. In order to minimize the covering of a screen, the visual information may be implemented to be initially displayed as a relative abbreviation or symbol and be then output as specific visual information when a touch gesture is sensed on the corresponding abbreviation or symbol.

When a large number of similar or identical objects exist around the selected object, the controller 280 may limit the amount of visual information related to the object. That is, when a large number of object selectable by the marker exist around the selected object, the controller 280 may decide that the user will select a plurality of objects for a short period of time, and provide only the minimum information (e.g., information on 'the lowest price on the Internet' when the selected object is a 'tag') to be most interested by the user. Here, the controller 280 puts the information processing time before the amount of information.

If a third input is sensed, the controller 280 may display a second image of the selected object and visual information related to the second image in an area distinguished from that of the first image, and display a new marker on the first image output on the display unit 251. That is, the controller 280 may display the previously selected in a separate area of the display unit 251, and select another object using the marker.

Here, the third input may be implemented using a method identical or similar to those of the first and second inputs. For example, the controller 280 may analyze an input voice signal and process the analyzed voice signal as an input signal value corresponding to the third input ('next').

Figure 7A:
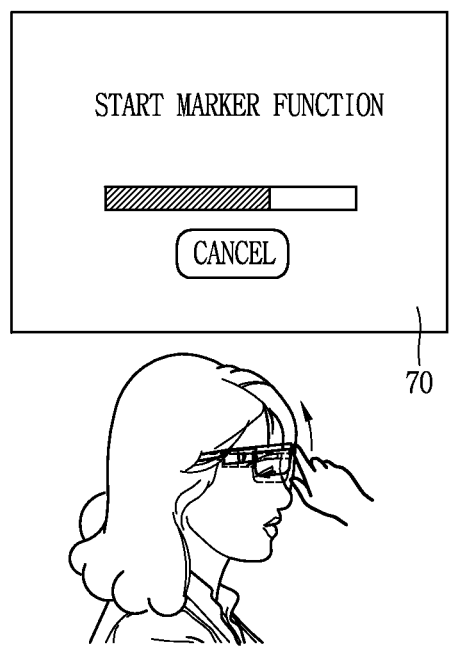
Figure 7B:
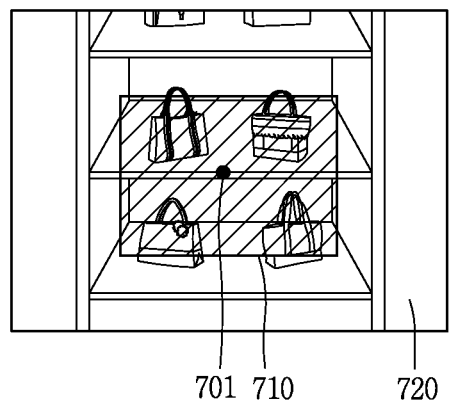

FIGS. 7(*a*) to 7(*d*) are conceptual diagrams illustrating examples of a method for performing a marker function for obtaining visual information related to a selected object and a method for canceling the performance of the marker function according to an exemplary embodiment.

If a first control signal corresponding to a predetermined input is received, the controller performs a marker function of displaying a marker on a first image output on the display unit 251.

For example, if the user of the glass type terminal 200 performs a gesture of raising one area of the frame part of the main body, e.g., a space area 205 of the display unit 251, corresponding to the space between both eyes of the user, as shown in FIG. 7(*a*), the controller the gesture as the first control signal. Accordingly, the infrared light emitting part 255 provided in the main body can be activated to output infrared light. In addition, a screen 70 representing that the performance of the marker function is started can be output on the display unit 251.

If the marker function is performed, a spot-shaped marker is displayed at the center of a preview screen 710 output on the display unit 251 as shown in FIG. 7(*b*). As shown in FIG. 7(*c*), the user may control a marker 701 to be placed on an interested object, e.g., a bag on a preview screen 710" by moving the user's head to the top/bottom/left/right or performing a touch gesture on the displayed marker.

Next, if a second control signal corresponding to a predetermined input is received, the controller may end the performance of the marker function so that the marker disappears on the first image output on the display unit 251.

For example, if the user of the glass type terminal 200 slides a touch sensor of the frame part of the main body in one direction during the performance of the marker function, the controller may recognize the sliding of the touch sensor

206 as a second control signal. Accordingly, as shown in FIG. 7(*d*), a screen 70" notifying that the performance of the marker function is ended can be output on the display unit 251. Thus, the marker output on the display unit 251 disappears.

When the user performs a gesture of sending the marker to the exterior of the display unit 251 by touching the marker in the state in which the marker is displayed in one area of the display unit 251 as shown in FIG. 7(*b*) or 7(*c*), the controller may also control the marker output on the display unit to disappear. In addition, the performance of the marker function is ended.

Figure 8A:
FIGS. 8A(a) to 8B(c) are conceptual diagrams illustrating a method for displaying an object recognized using a marker on a screen according to an exemplary embodiment.
Figure 8A:
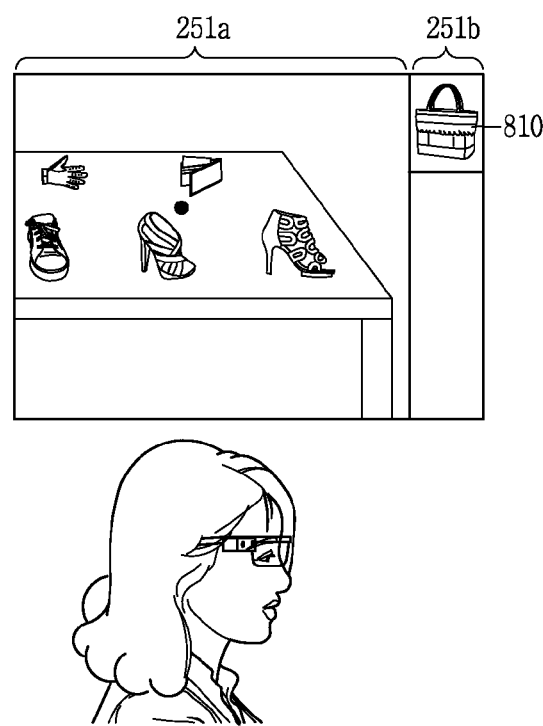

FIGS. 8A(*a*) to 8B(*c*) are conceptual diagrams illustrating a method for displaying an object recognized using a marker on a screen according to an exemplary embodiment.

The method for selecting an object displayed on the display unit 251 using the marker may be variously implemented.

For example, the controller may change at least one of the position and size of the marker, based on a predetermined user gesture. The controller may change the selection of the object, based on the at least one of the changed position and size of the marker.

For example, if a predetermined input signal, e.g., a voice signal ('OK') is input in a state in which a bag image 810 selected by a marker 801 and visual information 815 including brand, price information and the like, matched to the bag image 815, are output in the display unit 251 as shown in FIG. 8A(*a*), a preview screen is continuously output in a first area 251*a* of the display unit 251 as shown in FIG. 8A(*b*), and a selected bag image 810 is displayed in a second area 251*b* distinguished from the first area 251*a*. The marker 801 is again displayed at the center of the first area 251*a*.

In this state, if the user performs a pinch-out gesture input by touching the marker 801 with a plurality of fingers as shown in FIG. 8A(*c*), the size of the marker 801 is increased in proportion to the degree of the pinch-out gesture input (e.g., the spacing distance between both fingers, the number of pinch-out gesture inputs, etc.). As such, it is possible to simultaneously select a plurality of objects 820 and 830 using a marker 801" of which size is increased. For example, if the user inputs a voice signal, i.e., 'OK' as shown in FIG. 8A(*c*), first visual information 825 and second visual information 835 respectively corresponding to the selected first and second objects 820 and 830 may be simultaneously displayed.

Meanwhile, if a pinch-in gesture input is applied to the marker 801" of which size is increased, the controller may display the marker by decreasing the size of the marker. Accordingly, the range or number of objects selected through the marker 801 is also decreased.

Although not shown in FIG. 8A(*a*) to 8A(*d*), the input method for changing the position or size of the marker is not limited to the touch gesture described above. For example, if a voice command, i.e., 'large' is input in the state in which the marker is displayed, the controller may display the marker by increasing the size of the marker. If a voice command, i.e., 'small' is input in the state in which the marker is displayed, the controller may display the marker by decreasing the size of the marker. The controller may change the display position of the marker by tracking the movement of a user's pupil.

The controller may fix the marker in a predetermined area of the display unit 251, e.g., at the center of the display unit 251, and recognize an object entering into the predetermined area, thereby displaying visual information related to the object.

Figure 8B:
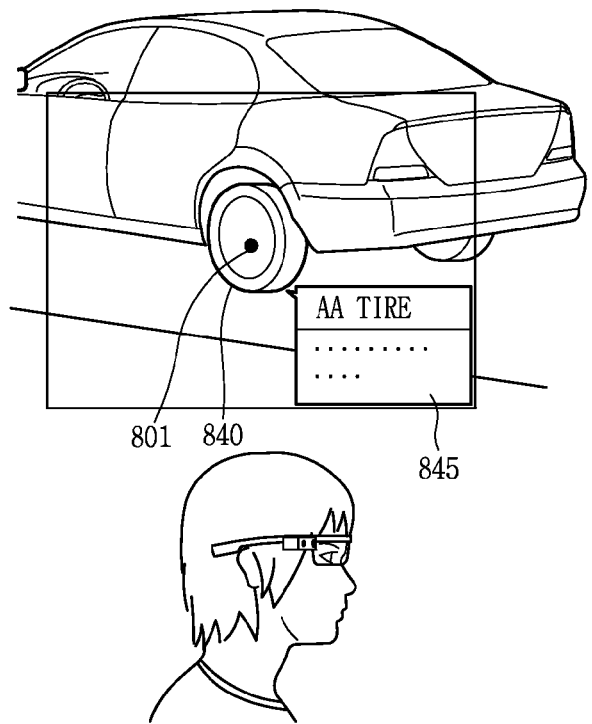
Figure 8B:
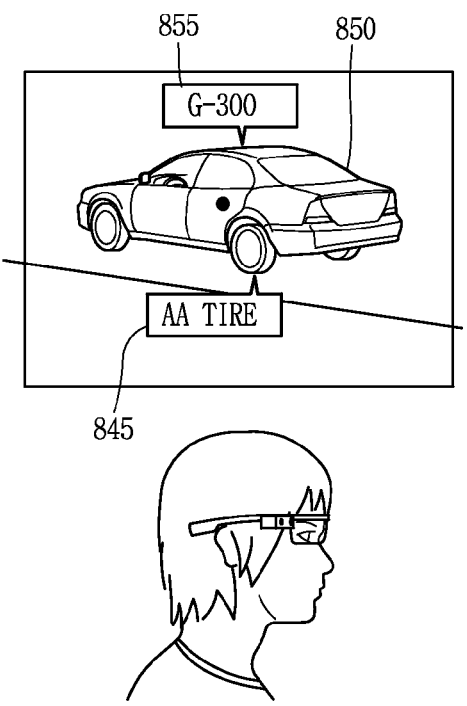
Figure 8B:
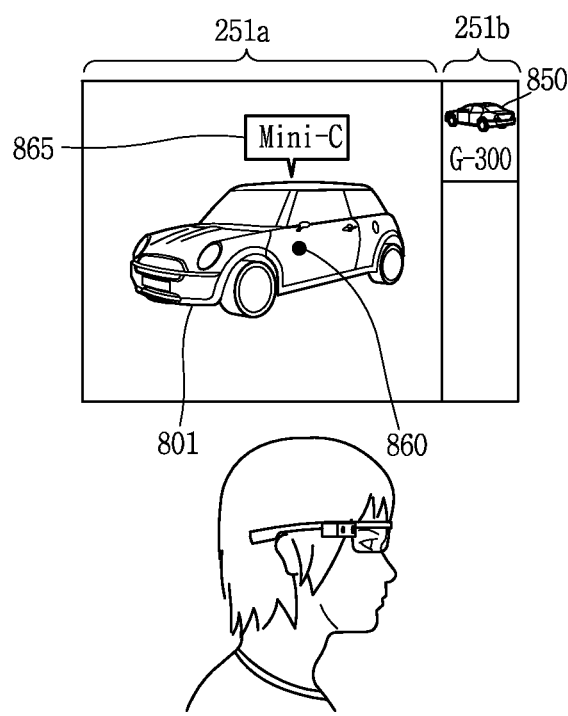

For example, if an image 840 of a vehicle wheel is recognized by the marker 801 displayed at the center of a preview screen as shown in FIG. 8B(*a*), a pop-up image 845 including corresponding visual information, e.g., the name, brand and the like of the vehicle wheel is displayed adjacent to the image 840 of the vehicle wheel. If a vehicle corresponding to the image 840 of the vehicle wheel moves in the state in which the marker 801 is fixed at the center of the screen, the image recognized by the marker 801, as shown in FIG. 8B(*b*), may be changed from the image 840 of the vehicle wheel into an image 850 of the entire vehicle. Accordingly, visual information 855 related to the image 850 of the vehicle is displayed adjacent to the image 850 of the vehicle. When the immediately previously recognized image and the currently recognized image are in the relationship between a portion of an image and the entire image, visual information 845 related to an image of the previously recognized portion may be continuously displayed.

Next, if the object recognized by the marker 801 is changed into a completely different one in the state in which the marker 801 is continuously fixed at the center of the screen, visual information corresponding to an image of an object newly recognized by the marker 801 in the first area 251*a* of the display unit 251, and an image of an object previously recognized by the marker 801 is displayed as described in FIG. 8A(*b*).

Figure 9A:
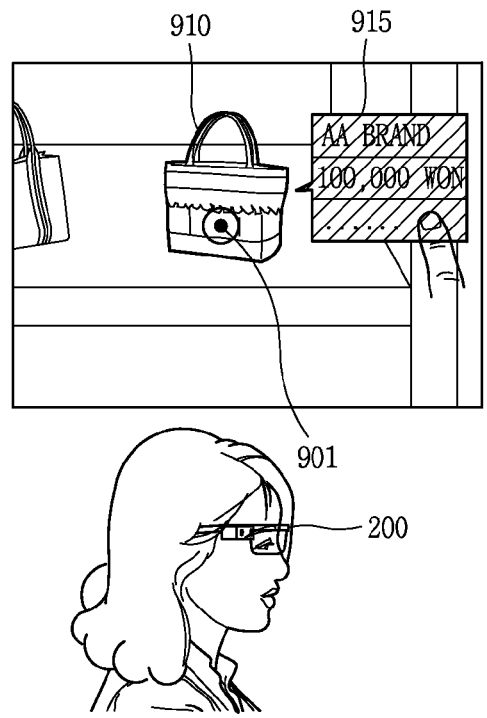
FIGS. 9(a) to 9(c) are conceptual diagrams illustrating a method for outputting detailed information on visual information related to an object selected using a marker according to an exemplary embodiment.
Figure 9B:
Figure 9C:

FIGS. 9(*a*) to 9(*c*) are conceptual diagrams illustrating a method for outputting detailed information on visual information related to an object selected using a marker according to an exemplary embodiment.

If a specific object image is selected by the marker, the controller displays visual information related to the selected object image to be adjacent to the selected object image. If a predetermined touch gesture is sensed in the area where the visual information is output, the controller may output detailed information on the visual information on the display unit 251.

Here, the contents of the detailed information on the visual information may be determined based on an analysis result of the selected object image and information included in the visual information. For example, when the selected object image is a bag image 910, and a pop-up image 915 including brand and price information, matched to the bag image 910, is provided as visual information as shown in FIG. 9(*a*), a detailed information image 918 related to the pop-up image 915 is popped up as shown in FIG. 9(*b*), when the user performs a touch gesture in the area where the pop-up image 915 is displayed. Here, a plurality of websites where the user can purchase the selected bag image 910 have been illustrated, but the present disclosure is not limited thereto.

If a touch gesture is sensed on at least one item in the popped-up detailed information image 918 as shown in FIG. 9(*b*), the controller may control the display unit 251 to move to a webpage screen 902 corresponding to the item on which the touch gesture is sensed. That is, a specific webpage screen is output as a virtual image on the display unit 251, instead of a preview screen actually viewed by the user.

Here, the specific webpage screen may be a screen on which a user's login process is automatically performed. That is, when the user wears the glass type terminal 200, a user authentication process may be automatically performed or be performed through voice authentication. If the moved specific webpage is previously bookmarked, a separate login process performed by the user may be omitted. Accordingly, as shown in FIG. 9(*c*), a product matched to the selected object image 910 can be immediately purchased.

Meanwhile, the controller may perform a function of tacking an object selected using a marker. Hereinafter, FIGS. 10(a) to 10(d) are conceptual diagrams illustrating a method for tacking an object selected using a marker.

As described above, the marker is displayed in only the display unit 251 that the camera can recognize. However, although an object selected by the marker moves and disappears from the display unit 251, it may be required to recognize the position of the selected object for a certain period of time. When the object that has disappeared is again found on the display unit 251, visual information related to the object is preferably displayed next to the object.

Accordingly, the controller can control the marker to move along the selected object on the display unit 251. Further, the controller can control visual information related to the selected object to move along the corresponding object even when the marker is fixed at the center of the display unit 251. In this state, if the object selected by the marker is out of the display unit 251, the marker cannot be displayed along the selected object.

If the object selected by the marker is out of a predetermined range, based on the display unit 251, an indicator representing the degree and position where the selected object is out of the predetermined range may be output in one area of the display unit 251. Subsequently, if the selected object again enters into the predetermined range of the display unit 251, the controller may control the marker to be again displayed along the selected object.

Figure 10A:
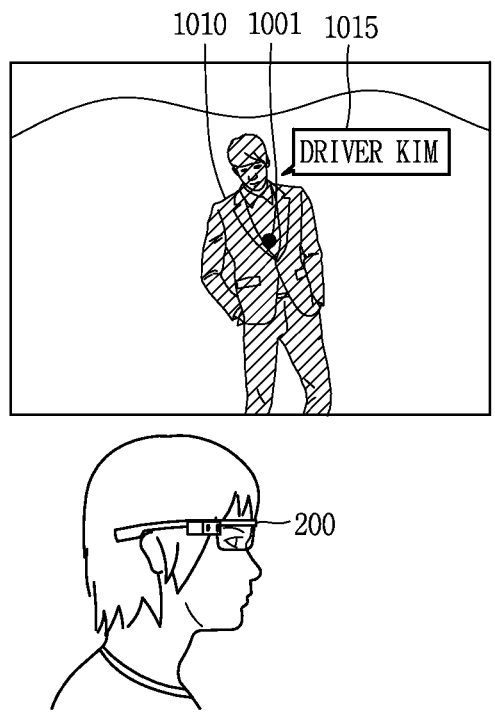
FIGS. 10(a) to 10(d) are conceptual diagrams illustrating a method for tacking an object selected using a marker.

For example, when an image 1010 of a specific person is selected by a marker 1001 fixed at the center of a screen as shown in FIG. 10(a), visual information related to the selected specific person, e.g., the name of the person is displayed, together with a display corresponding to the selection, as a pop-up image 1015 on the display unit 251.

Figure 10B:
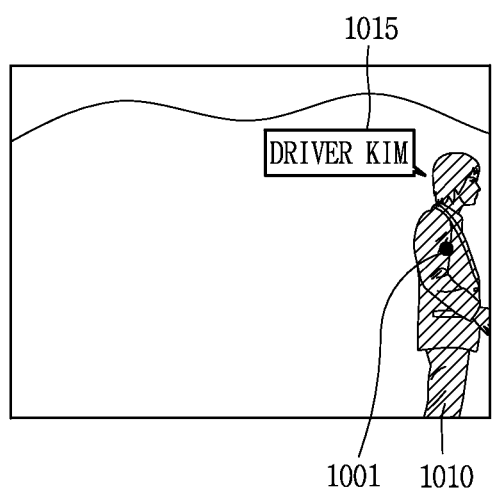

If a specific image is selected by the marker 1001 as described above, the movement function of the marker 1001 may be activated. That is, the marker 1001 is not fixed at the center of the screen but displayed along the image 1010 of the selected person as shown in FIG. 10(b). In addition, a pop-up image 1015 including visual information related to the selected person is also displayed along the image 1010 of the person.

Figure 10C:
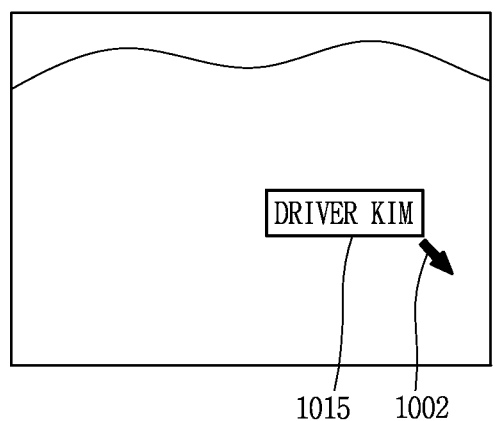
Figure 10D:
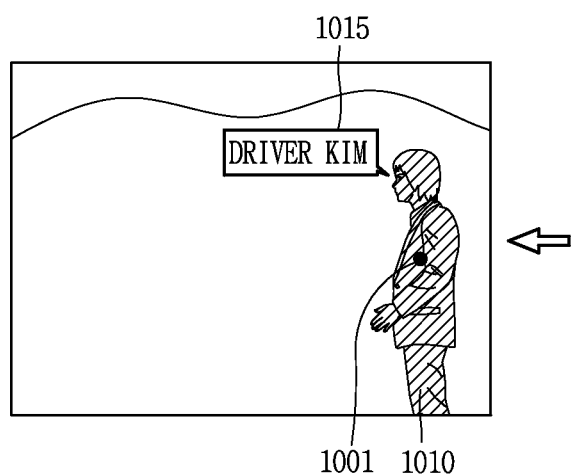

If the image of the selected person is out of the recognition range of the camera 221, i.e., the display unit 251, the controller may estimate the degree and position where the image of the selected person is out of the display unit 251, and change the marker 1001 into an indicator 1002 representing the estimated position of the person. That is, as shown in FIG. 10(c), an arrow image 1002 indicating the point where the selected person is out of the screen may be displayed instead of the marker 1001. In this state, the visual information 1015 related to the image of the selected person may be continuously displayed together with the arrow image 1002, as shown in FIG. 10(d).

The indicator may be changed into another shape, in proportion to the time when the selected object is out of the display unit 251. For example, the length of the arrow image may be increased in proportion to the time when the specific person is out of the display unit 251. If a predetermined time (e.g., five minutes) elapses, the controller may control visual information related to the indicator and the selected object to be no longer displayed on the display unit 251.

The object selected by the marker and the visual information related to the selected object may be stored in a selected area of the glass type terminal.

Specifically, the controller may control an object selected by the marker and the visual information related to the selected object to be stored in a selected area, in response to that a predetermined input signal (e.g., a voice signal, i.e., 'store') is sensed. Here, the selected area may be a separate area of the memory 170, and be stored in different folders for categories of the selected object.

Figure 11A:
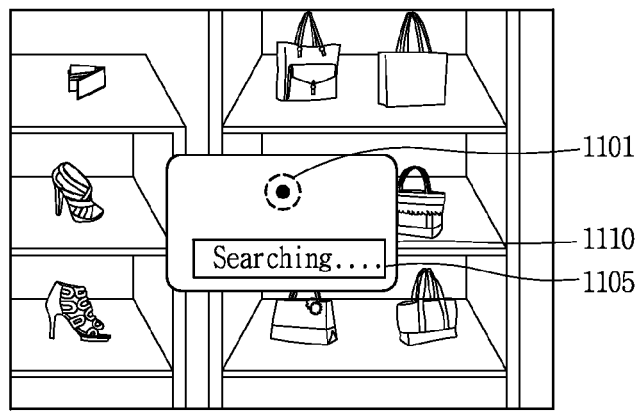
FIGS. 11(a) to 11(c) are conceptual views illustrating a method for providing previously stored visual information corresponding to an object previously stored using a marker when the previously stored object is recognized according to an exemplary embodiment.
Figure 11B:
Figure 11C:
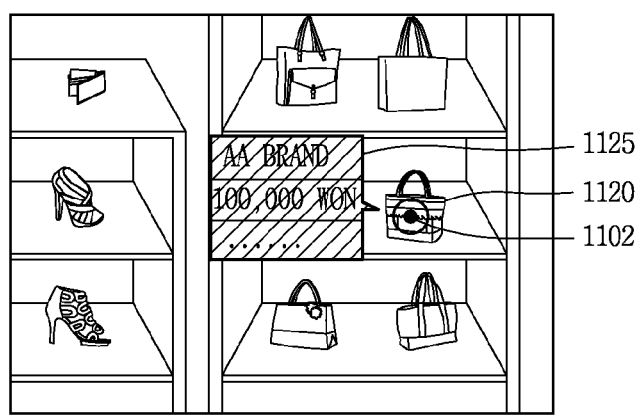

FIGS. 11(a) to 11(c) are conceptual views illustrating a method for providing visual information related to an object corresponding to a previously stored object image when the object corresponding to the previously stored object image is recognized according to an exemplary embodiment.

The controller may detect an object corresponding to an object image previously stored on a preview screen output on the display unit 251, using the marker. That is, the controller decides whether an object image indicated by the marker is identical to the previously selected object image by matching, in real time, an object existing in the area where the marker is displayed to the previously stored object image.

To this end, the glass type terminal 200 may automatically perform an object search function or perform the object search function in advance through a user input. In this case, as shown in FIG. 11(a), visual information 1105 representing that an object is being searched may be output on the display unit 251.

The controller may select a specific object image or specific category to be searched in the previously stored object image, based on a user input. In this case, the controller controls a specific object selected by the marker to be matched to only a specific object image or category to be searched.

If an object image matched to the previously stored object image is found through the marker, the controller provides the display unit 251 with previously stored visual information matched to an alarm representing the detection. Here, the alarm representing the detection may be output in the form of a message 1108 such as 'Has found a bag you wants to buy' as shown in FIG. 11(b). Alternatively, a predetermined guidance voice may be output, or a highlighting effect (e.g., a flickering effect, a change in color, size or transparency, a stereoscopic effect, etc.) may be output to the object image viewed on the screen. When the searching is successfully performed, the shape of the marker may be changed as a different one (1102) as shown in FIG. 11(b). As shown in FIG. 11(c), previously stored visual information 1125 related to a searched bag image 1120 is displayed adjacent to the bag image 1120.

Meanwhile, the controller may update visual information related to an object image stored in a selected area.

Specifically, if data received from an external server or external device, or information input to the glass type terminal 200 is update information related to an object image stored in a selected area, the controller may change visual information related to the stored object image, based on the received update information. For example, when the stored object image is a specific person, and the address information of a terminal corresponding to the specific person is changed, the controller may update the visual information related to the selected object image to include the changed address information. The update may be performed whenever a marker function is performed.

In FIGS. 11(a) to 11(c), the case where the object to be searched using the marker is searched based on the object image previously stored in the selected area has been illustrated as an example, but the present disclosure is not limited thereto. The search function using the marker may be performed using, as a target, an object image specified through web searching, a photographic image stored in the glass type terminal, or the like.

Figure 12A:
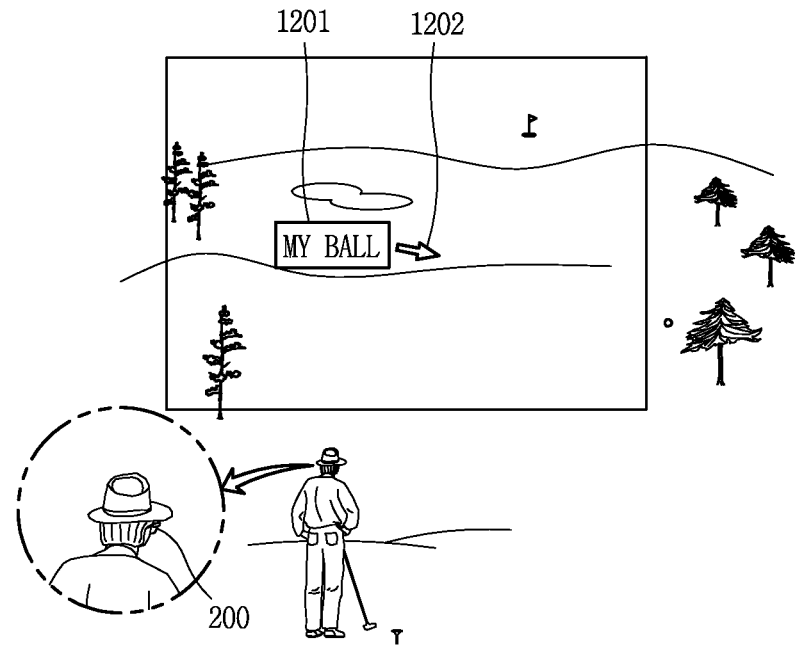
FIGS. 12A(a) to 12D(b) are conceptual diagrams illustrating various examples in which different visual information is provided or a different function is performed depending on the type of an object selected using a marker according to an exemplary embodiment.
Figure 12A:
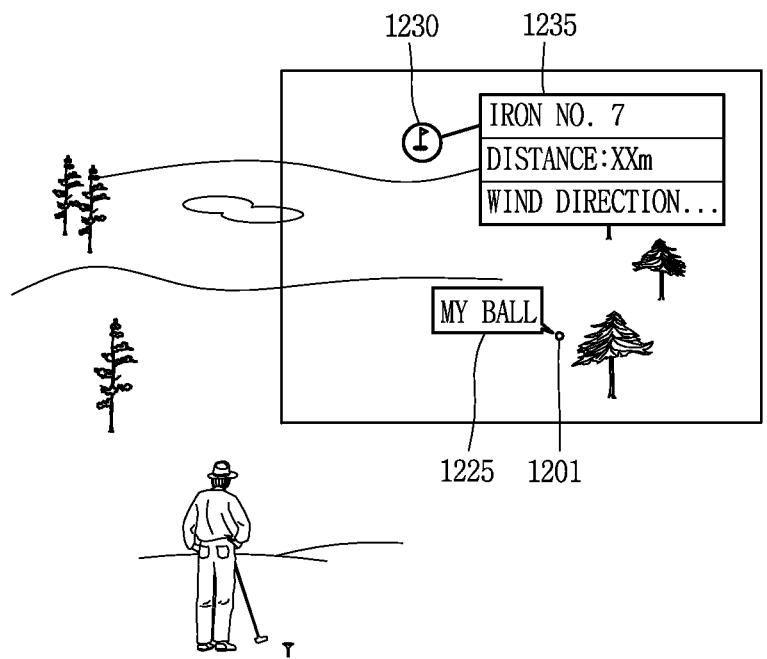

FIGS. 12A(a) to 12D(b) are conceptual diagrams illustrating various examples of visual information provided or a function performed, depending on the type of an object selected using a marker according to an exemplary embodiment.

The contents, amount and display method of visual information related to an object image selected using the marker may be differently determined depending on the type of the selected object.

The visual information related to the object image may include visual information corresponding to the performance of a function related to the object image. More specifically, the visual information related to the selected object image may include at least one of a capture image of the selected object image, a web search result matched to the selected object image, installation information of an application corresponding to the selected object image, guidance information of a process related to the selected object image, position information of an object corresponding to the selected object image, and control information of an external device corresponding to the selected object image.

The controller may change the shape of the marker displayed on the display unit 251 to correspond to the visual information related to the object image or the category or type of the function.

For example, the marker is initially displayed as a spot image, and may be changed into a magnifier image when a web search function for the selected object image is performed. If the displayed visual information is price information of the selected object image, the marker is changed into a '$' image, so that the user can intuitively recognize the category of the provided visual information.

FIGS. 12A(a) and 12A(b) illustrate examples in which the user of the glass type terminal 200 uses the marker function in a golf course.

As shown in FIG. 12A(a), the marker may track the position of a 'user's golf ball' on the display unit 251. If it is decided as the tacking result that the 'user's golf ball' is out of the display unit 251, the marker is changed into an arrow image 1202 that is an indicator indicating a point where the 'user's golf ball is out of the display unit 251, and a pop-up image 1225 including visual information related to the 'user's golf ball', i.e., a text 'my ball' is displayed adjacent to the arrow image 1202.

When the marker has found the 'user's golf ball' on the display unit 251, the marker 1201 is again displayed on the image of the 'user's golf ball' as shown in FIG. 12A(b). If the image of the 'user's golf ball' is searched on the display unit 251, the marker tracks the position of a 'golf hole' displayed on the display unit 251. In addition, visual information 1235 useful for the user is provided on the image of the golf hole, based on position information (distance and direction from the golf hole) and environment information (e.g., wind direction, etc.) of the searched 'user's golf ball'. For example, as shown in FIG. 12A(b), the visual information 1235 related to golf, such as a recommended golf club, a distance to the golf hole and a current wind direction, is provided in the form of a pop-up image.

Figure 12B:
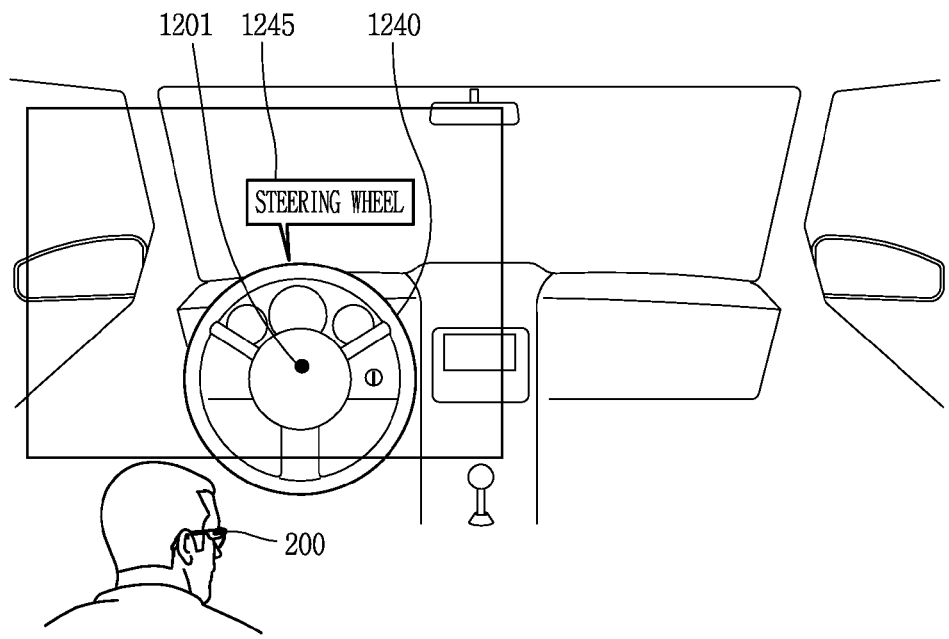
Figure 12B:
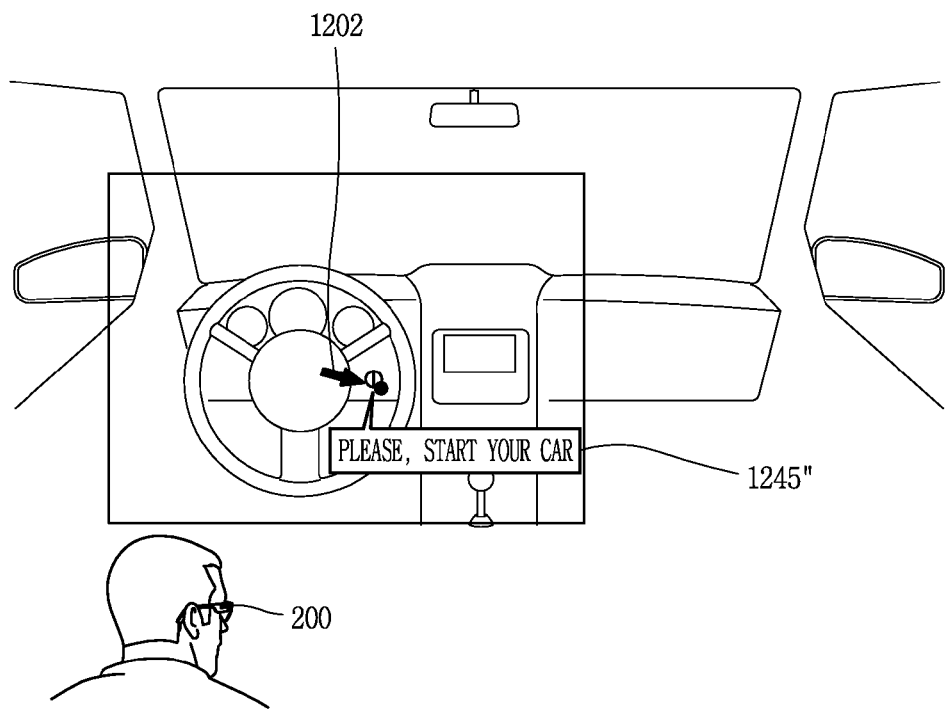

FIGS. 12B(a) and 12B(b) illustrate examples in which the user of the glass type terminal 200 uses the marker function in a 'vehicle'.

As shown in FIG. 12B(a), if a marker 1201 is fixed to a steering wheel image 1240 of a vehicle, displayed on the display unit 251, visual information related to the steering wheel image 1240, e.g., a pop-up image representing a text 'steering wheel' is displayed adjacent to the steering wheel image 1240. If the marker 1201 is fixed to the steering wheel image 1240 of the vehicle for a predetermined period of time before the starting of the vehicle is performed, the controller recognizes the fixing of the marker 1201 as a 'trigger signal' for driving the vehicle. That is, vehicle driving guidance information related to the steering wheel image 1240 selected by the marker may be output in a previously stored order.

For example, as shown in FIG. 12B(b), the pop-up image 1245 is changed into visual information of guiding an operation for performing the starting of the vehicle, i.e., a pop-up message 1245" such as "Please, start your car". In addition, the marker 1201 may be changed into an indicator indicating the position of an object related to the starting of the vehicle, i.e., an arrow image 1202 on the display unit 251. When the object image selected by the marker is a trigger object guiding a user's consecutive operations, visual information corresponding to the consecutive operations may be sequentially displayed on the display unit 251.

Similarly, when the selected object image is an indoor air conditioner, the controller may generate a trigger signal for operating the air conditioner and transmit the generated trigger signal to the air conditioner, when the marker is displayed on a specific point of the air conditioner, e.g., a power button.

Hereinafter, FIG. 12C(a) to 12C(c) illustrate examples in which a name card function is performed when an object selected by the marker is a specific person.

Figure 12C:
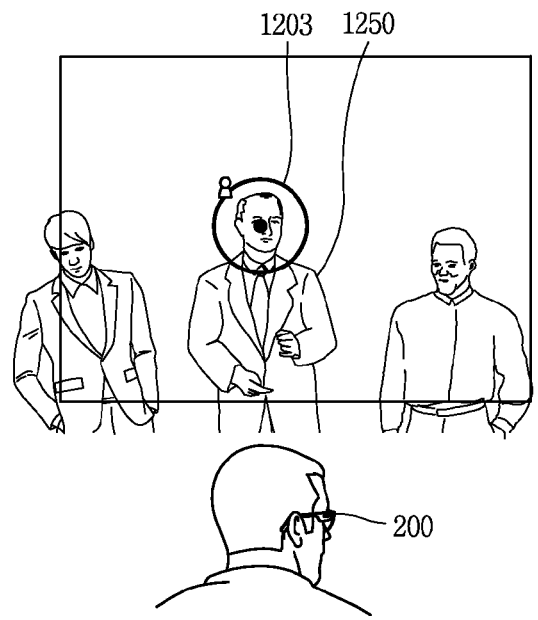
Figure 12C:
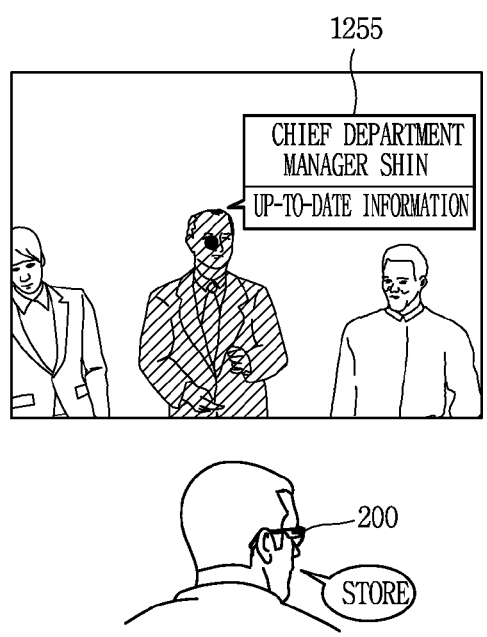
Figure 12C:
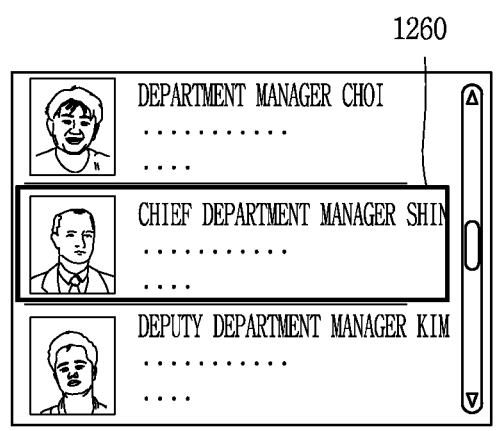

If the object selected by the marker 1203 is a specific person 1250 as shown in FIG. 12C(a), the shape of the marker may be changed into a marker 1203 corresponding to the name card function. For example, the size of the original image may be increased in proportion to the size of the face of the selected specific person 1250 in order to extract the face of the specific person.

As shown in FIG. 12C(b), visual information related to the specific person 1250 selected by the marker 1203 may be determined by speech contents of the user and/or the selected specific person 1250. For example, when the selected specific person 1250 speaks 'I'm a chief department manage Shin' and 'We're going to have a meeting at 10 o'clock tomorrow, aren't we?', the glass type terminal 200 generates visual information related to the selected specific person 1250, e.g., a pop-up image 1255 including the name of the person, up-to-date schedule information, and the like, based on the corresponding speech contents, and displays the generated visual information to be adjacent to the specific person 1250. In this state, if the user inputs a voice signal, i.e., 'store', an image of the selected specific person 1250 and visual information related to the image are stored in a name card application, an address application, or the like.

Figure 12D:
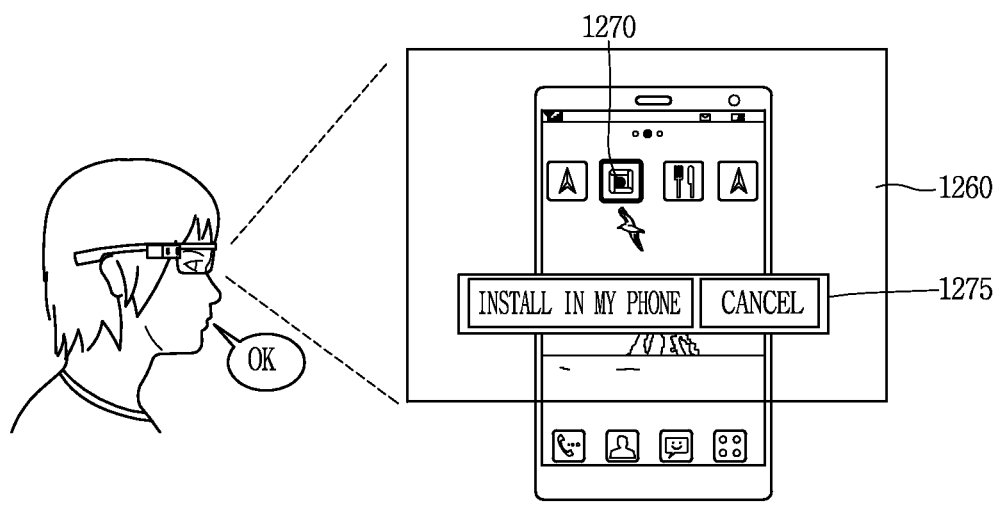
Figure 12D:
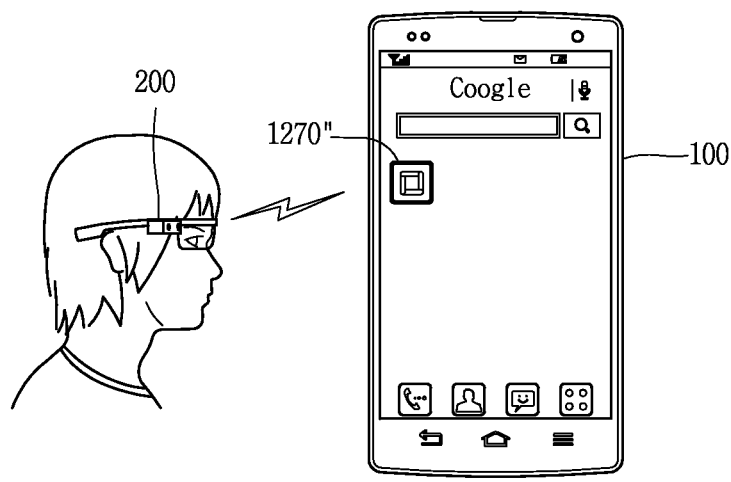

FIGS. 12D(a) and 12D(b) illustrate examples in which when the object selected by the marker is an icon of an application installed in an external device, an installation function of the corresponding application is performed.

When the marker 1201 is fixed to an icon 1270 of a specific application output on a display of an external terminal as shown in FIG. 12D(a), a message 1275 related to the installation of the application may be output as visual information related to the icon 1270 of the application. As an example, if the user inputs a voice signal, i.e., 'OK', an application 1270" corresponding to the icon 1270 is automatically downloaded from a cloud server in the a terminal 100 connected to the glass type terminal 200 as shown in FIG. 12D(b). As another example, an application corresponding to the external terminal may be 'copied', and the copied application may be directly pasted in the terminal connected to the glass type terminal.

Figure 13A:
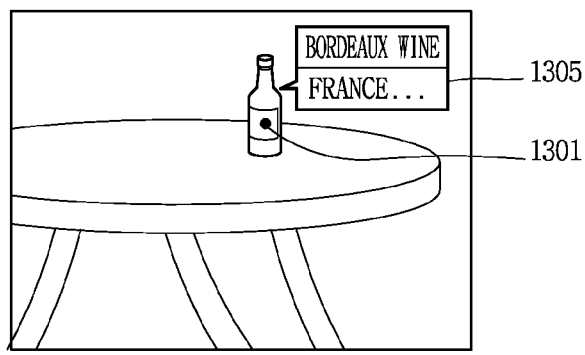
FIGS. 13(a) to 13(c) are conceptual diagrams illustrating a processing method when an object selected using a marker is not to be recognized according to an exemplary embodiment.
Figure 13B:
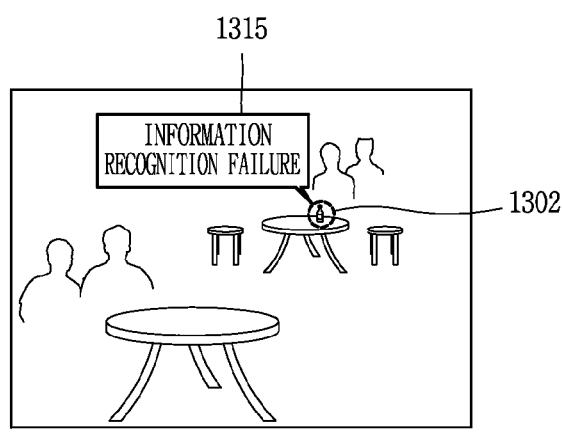
Figure 13C:
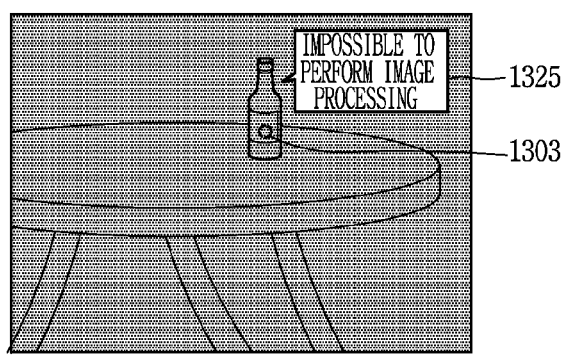

FIGS. 13(a) to 13(c) are conceptual diagrams illustrating a processing method when an object selected using a marker is not to be recognized by the camera 221 according to an exemplary embodiment.

As described above, the recognition range of an object viewed by the camera 221 is different from that of the object viewed by the user. That is, the object viewed in the user's viewing angle may be out of the recognition range of the camera 221. Although an object is within the recognition range of the camera 221, the illumination intensity around the object or the resolution of an image of the object is low, and therefore, the object may not be recognized.

Accordingly, if it is decided that an object existing in the area where the marker is displayed cannot be recognized, the controller no longer displays the marker on the display unit 251, and outputs, on the display unit 251, a message representing that the processing on the image of the object selected by the marker cannot be performed.

For example, FIG. 13(a) illustrates a case where a wine bottle selected by a marker 1301 is image-processed so that a pop-up image including a brand and a place of production is output as visual information related to the selected wine bottle. FIG. 13(b) illustrates a case where since the wine bottle selected by the marker is too distant from the display unit 251, the image processing on the selected wine bottle is not performed, and a message 1315 representing 'information recognition failure' is output. FIG. 13(c) illustrates a case where since the ambient illumination intensity of the wine bottle selected by the marker is too dark, the image processing of the selected wine bottle is not performed, and a message 1325 representing 'impossible to perform image processing' is output. In FIGS. 13(b) and 13(c), the display of the marker disappears or is shown translucent (1302 or 1303) on the display unit 251.

Meanwhile, the user may desire to receive visual information of another category with respect to an object image selected by the marker. For example, when the object selected by the marker is a bag image, 'brand and price information' initially provided as visual information, but the user may desire to receive information on 'a celebrity having the corresponding bag'.

Accordingly, FIGS. 14(a) to 14(d) illustrate a method for changing visual information related to an object selected using a marker, based on a user's gesture according to an exemplary embodiment.

If a specific object is selected by the marker on a preview screen output on the display unit 251, visual information related to the selected object is displayed adjacent to the object. In this state, the controller may sense a touch gesture applied to the main body of the glass type terminal 200. The touch gesture, for example, may be a touch gesture of sliding the frame part of the main body, provided with a touch sensor, in one direction. However, the present disclosure is not limited thereto.

The controller may control visual information previously output on the display unit 251 to disappear from the display unit, in response to that the touch gesture is sensed, and output, on the display unit 251, another visual information corresponding to the performance of a function corresponding to the sensed touch gesture. Here, the another visual information means visual information corresponding to the performance of another function related to the selected object, and the kind and application order of the another function may be changed depending on the type of the selected object.

Figure 14A:
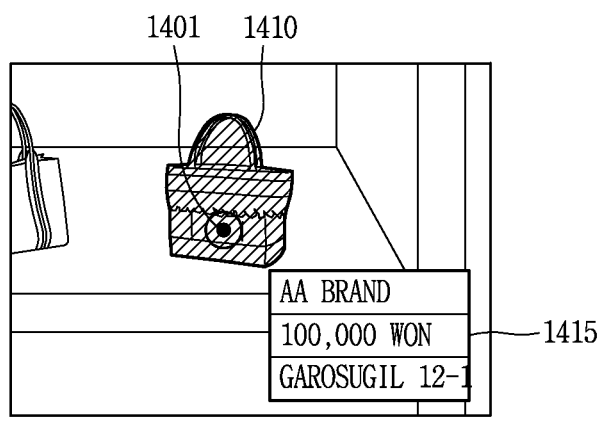
FIGS. 14(a) to 14(d) are conceptual diagrams illustrating a method for changing visual information related to an object selected using a marker, based on a user's gesture according to an exemplary embodiment.
Figure 14B:
Figure 14C:
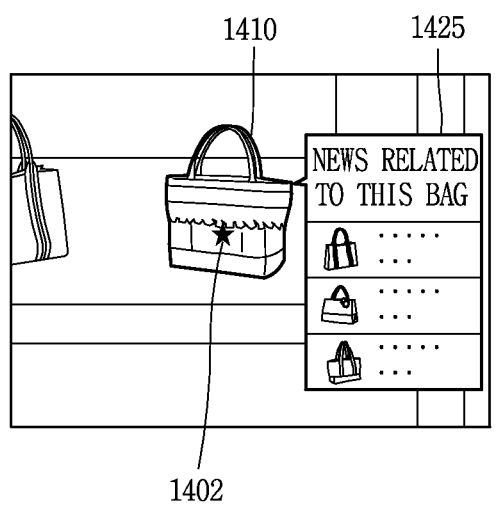
Figure 14D:
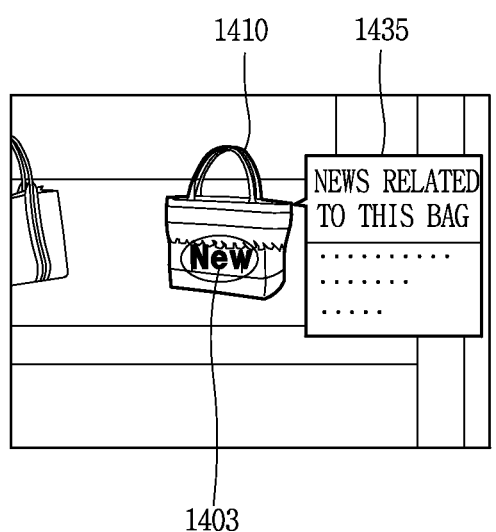

For example, if the user slides the frame part of the glass type terminal 200 in one direction as shown in FIG. 14(b) in a state in which brand, price information, dealer's position and the like, matched to visual information related to a bag image 1410 selected by a marker 1401 are output as shown in FIG. 14(a), visual information corresponding to the performance of a next function is output. Accordingly, as shown in FIG. 14(c), visual information 1425 corresponding to the performance of a 'function of searching another bag of the corresponding brand' is output, and the shape of the marker 1401 having a spot image is changed into a shape corresponding to the changed function, e.g., a marker 1402 having a star image. If the user slides the frame part of the glass type terminal 200 once more, visual information 1435 corresponding to the performance of a 'relative news search function' is output, and the marker 1402 having the star image is also changed into a marker 1403 having a text image, i.e., 'NEW', as shown in FIG. 14(d).

In order to change the visual information related to the object selected by the marker, a performable function related to the selected object may be previously provided to the user.

Figure 15A:
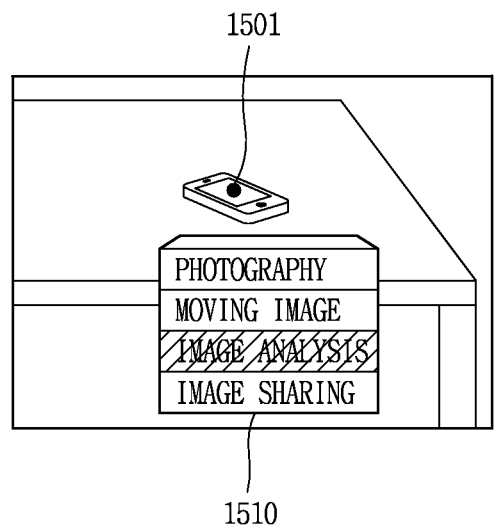
FIGS. 15(a) and 15(b) are conceptual diagrams illustrating a method for notifying a performable function related to an object selected using a marker according to an exemplary embodiment.
Figure 15B:
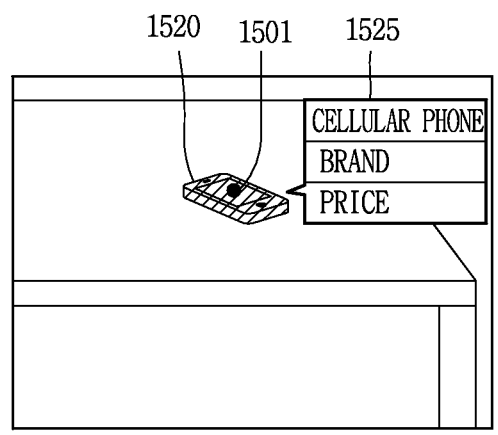

Accordingly, FIGS. 15(a) and 15(b) are conceptual diagrams illustrating a method for notifying a performable function related to an object selected using a marker according to an exemplary embodiment.

In FIG. 15(a), if a specific object is selected by a marker 1501, an item list 1510 of a performable function related to the selected object is popped up. A function which cannot be performed in the popped-up item list 1510 may be displayed in a non-activation state. When an 'image analysis' function is selected in the item list 1510, as shown in FIG. 15(b), a web search result corresponding to the analysis of the selected object, i.e., visual information 1525 including the name, brand, price information and the like of the object is displayed adjacent to a selected image 1520.

Meanwhile, the examples of selecting an object, tracking the selected object, and displaying visual information related to the selected object, using one marker displayed on the display unit 251 have been illustrated in the above description. Hereinafter, a method for selecting an object, tracking the selected object, or displaying visual information related to the selected object, using a plurality of markers.

FIGS. 16(a) to 16(d) illustrate a method for providing visual information related to a plurality of objects selected using a plurality of markers according to an exemplary embodiment. To this end, the glass type terminal 200 according to the exemplary embodiment may have a plurality of infrared light emitting parts, and each infrared light emitting part may be independently driven.

Figure 16A:
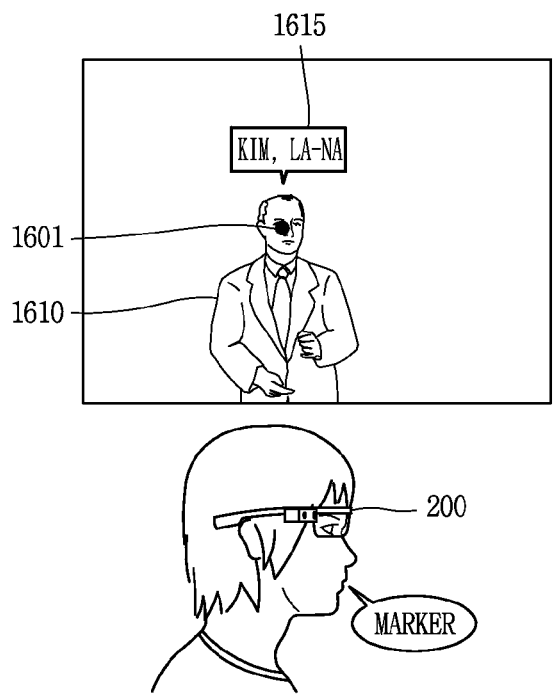
FIGS. 16(a) to 16(d) are conceptual diagrams illustrating a method for providing visual information related to a plurality of objects selected using a plurality of markers according to an exemplary embodiment.
Figure 16B:
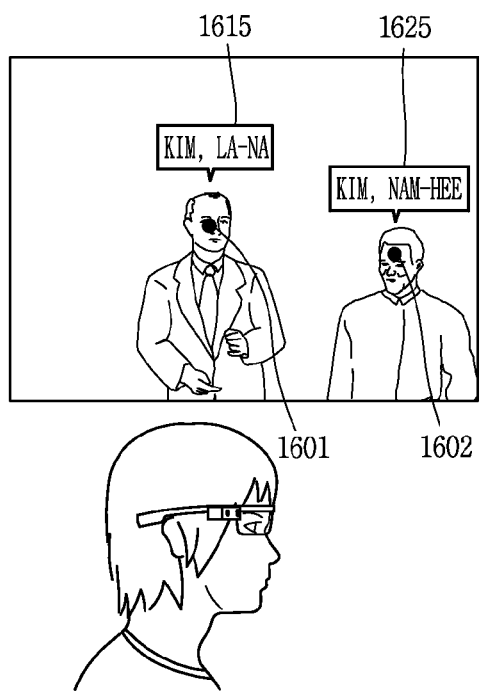
Figure 16C:
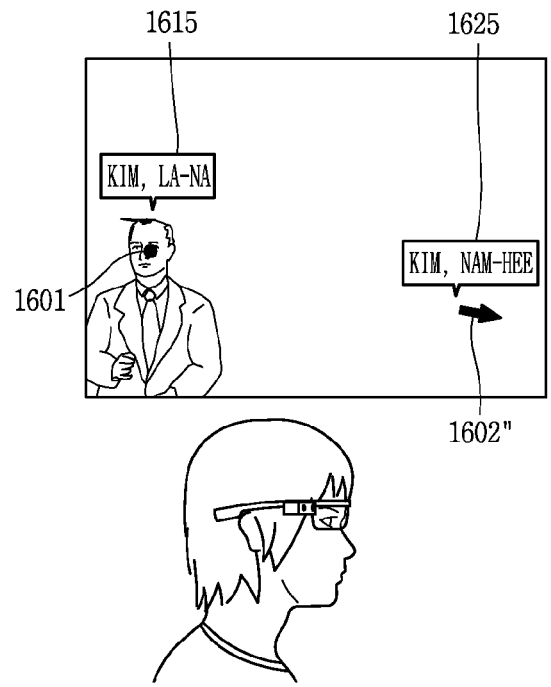
Figure 16D:
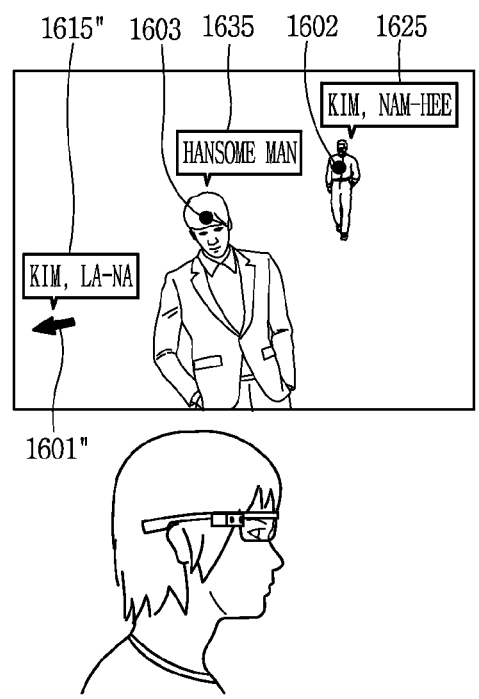

In this case, the controller may sense that a predetermined input signal related to the performance of the marker function is input in a state in which a specific object image is selected by a first marker. For example, if a voice command, i.e., 'marker' is input from the user in a state in which a specific person 1610 is selected by the first marker 1601 as shown in FIG. 16(a), a second marker 1602 is created to be displayed on the display unit 251 as shown in FIG. 16(b).

That is, if the predetermined input signal related to the performance of the marker function is input, the controller may control the second marker to be newly displayed on the display unit 251 while maintaining the display of the first marker.

As an example, the controller may control the first marker to continuously track the position of an object corresponding to the previously selected object image, and control the newly created second marker to select another object existing on a preview screen output on the display unit 251 according to the predetermined input signal. To this end, a first infrared light emitting part may be matched to the first marker, and a second infrared light emitting part may be matched to the second marker. When a person tracked by the second marker is out of the screen as shown in FIG. 16(*c*), the second marker may be changed into an indicator indicating a point where the corresponding person is out of the display unit 251. As another example, the first marker may be a virtual marker which does not perform other functions except that the first marker is displayed on an object image, and only the newly created second marker may perform an actual marker function.

The controller may control a new marker to be created whenever an object of a predetermined type is searched on the display unit 251. For example, if a new person appears on the display unit 251 while first and second markers 1601" and 1602 are respectively tracking specific persons as shown in FIG. 16(*d*), the controller may recognize that the type of the object is the same type of the object specified by the existing marker, and control a third marker 1603 to be created on a new person image. In this state, visual information 1615, 1625 and 1635 on persons specified by the respective markers may be searched from address information previously stored in the glass type terminal or be generated based on speech contents of the persons.

The created marker according to the exemplary embodiment is displayed by infrared light using an infrared wavelength band not viewed with person's eyes. Therefore, the marker is viewed by only the user. However, the marker may be viewed by a third person wearing another glass type terminal.

Figure 17A:
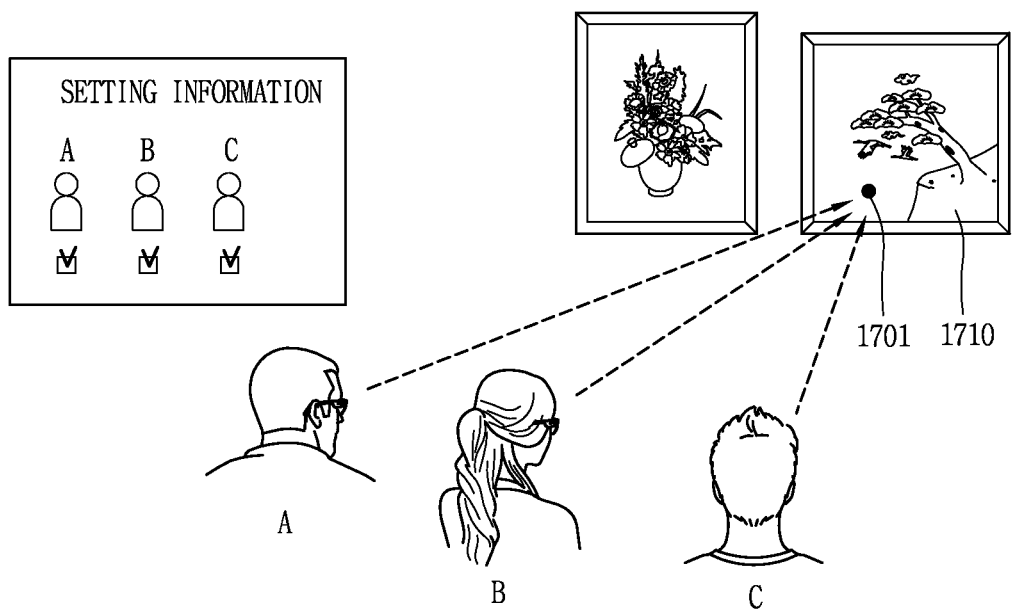
FIGS. 17(a) and 17(b) is a conceptual diagram illustrating a method for sharing a created marker with a third person according to an exemplary embodiment.
Figure 17B:
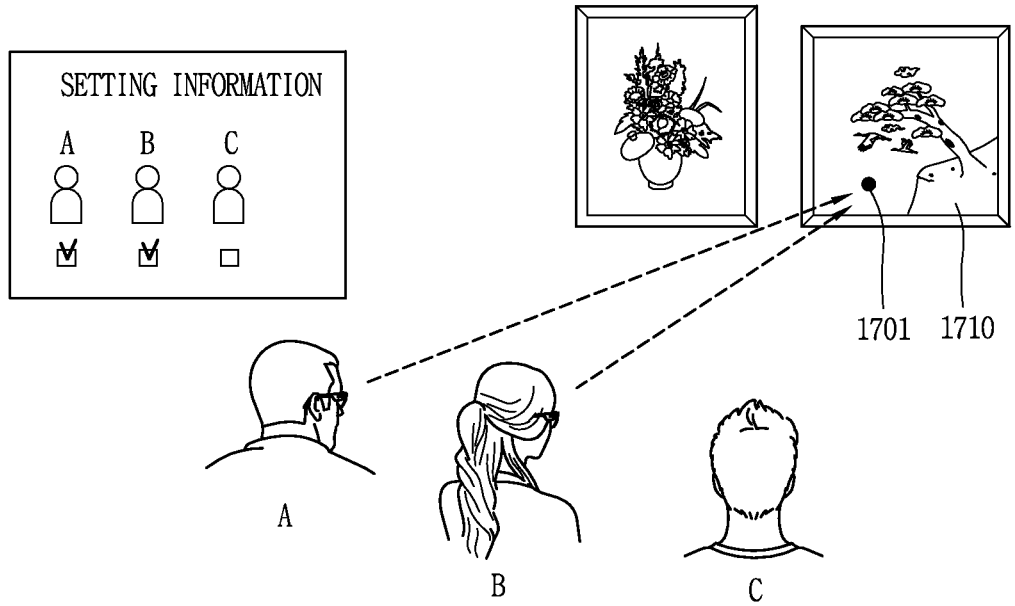

FIGS. 17(*a*) and 17(*b*) are conceptual diagrams illustrating a method in which the user of the glass type terminal shares a marker with a third person or hides the marker according to an exemplary embodiment.

The controller may change setting information related to the operation of the infrared light emitting part 255 from setting information of the glass type terminal 200. In this case, the controller may control the operation of the at least one infrared light emitting part 255 so that the color, size, shape and external recognition of an infrared signal transmitted from the infrared light emitting part 255, based on predetermined setting information.

Particularly, in relation to the external recognition of the marker, the controller may set the marker to be recognized to all third persons, set the marker to be recognized to only a third person wearing a glass type terminal, or set the marker to be recognized to only the user. This may be implemented by artificially changing the wavelength band of the infrared light emitted from the infrared light emitting part 255.

For example, when a marker 1701 is set to be viewed by a user A wearing the glass type terminal, a user B wearing another glass type terminal, and a user C wearing no glass type terminal in the setting information as shown in FIG. 17(*a*), the marker 1701 and an object 1710 selected by the marker 1701 are recognized by all the users. When the marker is set to be viewed by only the user A and the user B in the setting information, as shown in FIG. 17(*b*), the marker 1701 and the object 1710 selected by the marker 1701 may be recognized by the users wearing the glass type terminals. That is, only the users wearing the glass type terminals may share information related to the selected object.

As described above, according to the glass type terminal of the present disclosure, the camera and the infrared light emitting device are driven together, so that it is possible to minimize the difference between the recognition range of objects through the user's actual viewing angle and the recognition range of the objects through the terminal. Further, the user selectively performs image processing on only a user's interested object, so that it is possible to reduce the time taken to perform the image processing and to minimize waste of unnecessary resources.

According to the glass type terminal of the present disclosure, an object interested by the user of the terminal is recognized using the infrared light emitting device, and the user provides visual information desired by the user with respect to only the recognized object or provides user convenience in which a function related to the object is automatically performed. Accordingly, the complexity of a display is minimized. Further, when an object interested by the user of the terminal is out of the viewing angle of the terminal, the position of the object can be continuously tacked using the infrared light emitting device. Further, a marker indicating a specific object can be set to be viewed by only the user according to user setting, and a plurality of persons can share the marker when necessary.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An eyewear type terminal, comprising:
   a frame shaped to be wearable on a user's head;
   a camera coupled to the frame and configured to obtain an image;
   an infrared light emitting part coupled to the frame and configured to emit infrared light;
   a display coupled to the frame and configured to output an image; and
   a controller configured to:
   cause the display to display a first image obtained via the camera;
   activate the infrared light emitting part and cause the display to display the emitted infrared light as a movable marker over the first image in response to a first input;
   recognize an object on which the marker is positioned in response to a second input for selecting the object;
   cause the display to display first information related to the recognized object; and
   cause the display to stop displaying the marker on the selected object when the selected object is not recognized.

2. The eyewear type terminal of claim 1, wherein the controller is further configured to:
cause the display to display the marker at a predetermined position of the display in response to the first input;
select the object when the marker is moved from the predetermined position to the object; and
cause the display to display a second image comprising the selected object distinguishably from the first image such that the selected object is identified by the marker within the second image.

3. The eyewear type terminal of claim 2, wherein, in response to a third input received while the second image and the first information are displayed,
the controller is further configured to:
cause the display to display the second image and the first information at a first area of the display; and
cause the display to display a second marker on a second area of the display such that an additional object displayed in the second area is selectable when the second marker is placed over the additional object.

4. The eyewear type terminal of claim 2, wherein the controller is further configured to cause the display to display an indicator related to a zoom-in or zoom-out function of the camera when the first image is displayed.

5. The eyewear type terminal of claim 1, wherein the controller is further configured to change at least a position or a size of an selection area associated with the displayed marker according to user input comprising a gesture, at least the position or the size changed based on the gesture.

6. The eyewear type terminal of claim 5, wherein the controller is further configured to select an additional object or deselect the selected object based on at least the changed position or the changed size of the selection area.

7. The eyewear type terminal of claim 1, wherein:
the selected object is tagged with the marker such that the marker follows the object when the selected object moves on the display; and
the controller is further configured to cause the display to display an indicator when the selected object is not displayed,
the indicator indicating that the selected object is out of a predetermined range, the indicator further indicating an estimated position of the selected object that moved out of the display such that the selected object and the marker are re-displayable when the camera is redirected to the position indicated by the indicator.

8. The eyewear type terminal of claim 1, further comprising a wireless communication unit, wherein:
the controller is further configured to receive the first information via the wireless communication unit; and
the first information comprises at least installation information of an application associated with the recognized object, guidance information of a process related to the recognized object, or position information of the recognized object.

9. The eyewear type terminal of claim 1, wherein the controller is further configured to cause the display to display second information indicating that no information is available with regard to the selected object when the selected object is not recognized.

10. The eyewear type terminal of claim 1, wherein the controller is further configured to cause the display to stop displaying the first information and to display additional information related to the recognized object in response to user input received while the first information is displayed.

11. The eyewear type terminal of claim 1, wherein:
the controller is further configured to cause the display to display the marker in a shape corresponding to a type of the first information such that the marker is displayed in a different shape when a different type of information is displayed; and
the type of the first information comprises at least a type related to a person or a type related to a thing.

12. The eyewear type terminal of claim 1, wherein the infrared light emitting part comprises:
an infrared light emitting device configured to generate the infrared light;
a lens configured to receive the generated infrared light and convert the received infrared light into parallel light; and
a window configured to emit the converted parallel light received from the lens,
wherein a shape of the marker is changeable according to a structure and a shape of the window.

13. The eyewear type terminal of claim 1, wherein the infrared light emitting part comprises a plurality of infrared light emitting parts and at least one of the plurality of infrared light emitting parts is detachable from the frame.

14. The eyewear type terminal of claim 13, wherein the controller is further configured to cause the display to display a plurality of markers in the first image such that a plurality of objects in the first image are selectable with the plurality of markers, each of the plurality of markers corresponding to respective infrared light emitted from one of the plurality of infrared light emitting parts.

15. The eyewear type terminal of claim 1, wherein the controller is further configured to cause storing of a second image comprising the selected object and the first information in a memory.

16. The eyewear type terminal of claim 15, wherein the controller is further configured to cause the display to display:
a third image obtained via the camera; and
a notification notifying that the object is recognized in the third image based on the stored second image and first information.

17. The eyewear type terminal of claim 15, wherein the controller is further configured to:
receive updated information with respect to the stored second image and first information; and
update the stored first information based on the received updated information.

18. The eyewear type terminal of claim 1, wherein the controller is further configured to cause the display to display detailed information associated with the displayed first information in response to user input received via the displayed first information, the detailed information displayed on the display in addition to the displayed first information.

19. The eyewear type terminal of claim 1, wherein the controller is further configured to cause the display to display a second marker in addition to the marker already displayed on the display in response to a third input received while the maker is displayed on the selected object.

20. The eyewear type terminal of claim 19, wherein the controller is further configured to:
track the selected object when the selected object moves on the display; and
select a second object when the second marker is placed on the second object.

* * * * *